United States Patent
Spencer et al.

(10) Patent No.: US 8,410,729 B2
(45) Date of Patent: Apr. 2, 2013

(54) SPECIAL PURPOSE MODES IN PHOTONIC BAND GAP FIBERS

(75) Inventors: James Spencer, Menlo Park, CA (US); Robert Noble, San Jose, CA (US); Sara Campbell, Exeter, NH (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 218 days.

(21) Appl. No.: 12/804,942

(22) Filed: Aug. 2, 2010

(65) Prior Publication Data
US 2011/0298397 A1     Dec. 8, 2011

Related U.S. Application Data

(60) Provisional application No. 61/230,292, filed on Jul. 31, 2009.

(51) Int. Cl.
*H05H 7/00* (2006.01)
(52) U.S. Cl. .................................. 315/501; 315/506
(58) Field of Classification Search ........... 315/500–507
See application file for complete search history.

(56) References Cited

U.S. PATENT DOCUMENTS

| | | | | |
|---|---|---|---|---|
| 6,134,043 A | * | 10/2000 | Johnson et al. | 359/237 |
| 6,452,713 B1 | * | 9/2002 | White | 359/322 |
| 6,801,107 B2 | * | 10/2004 | Chen et al. | 333/234 |
| 2009/0072744 A1 | * | 3/2009 | Botto et al. | 315/5.41 |

OTHER PUBLICATIONS

X.E. Lin, "Photonic band gap fiber accelerator", Physical Review Special Topics—Accelerators and Beams, vol. 4, 051301 (© 2001, The American Physical Society), pp. 051301-1 through 051301-7. May 31, 2001.
C.-K. Ng et al, "Transmission and Radiation of an Accelerating Mode in a Photonic Bandgap Fiber", submitted for publication on Jul. 7, 2010 to Phys. Rev. ST: Accel and Beams, pp. 1-15.

* cited by examiner

*Primary Examiner* — James H Cho
(74) *Attorney, Agent, or Firm* — Crawford Maunu PLLC

(57) ABSTRACT

Photonic band gap fibers are described having one or more defects suitable for the acceleration of electrons or other charged particles. Methods and devices are described for exciting special purpose modes in the defects including laser coupling schemes as well as various fiber designs and components for facilitating excitation of desired modes. Results are also presented showing effects on modes due to modes in other defects within the fiber and due to the proximity of defects to the fiber edge. Techniques and devices are described for controlling electrons within the defect(s). Various applications for electrons or other energetic charged particles produced by such photonic band gap fibers are also described.

7 Claims, 27 Drawing Sheets

FREE ELECTRON LASER

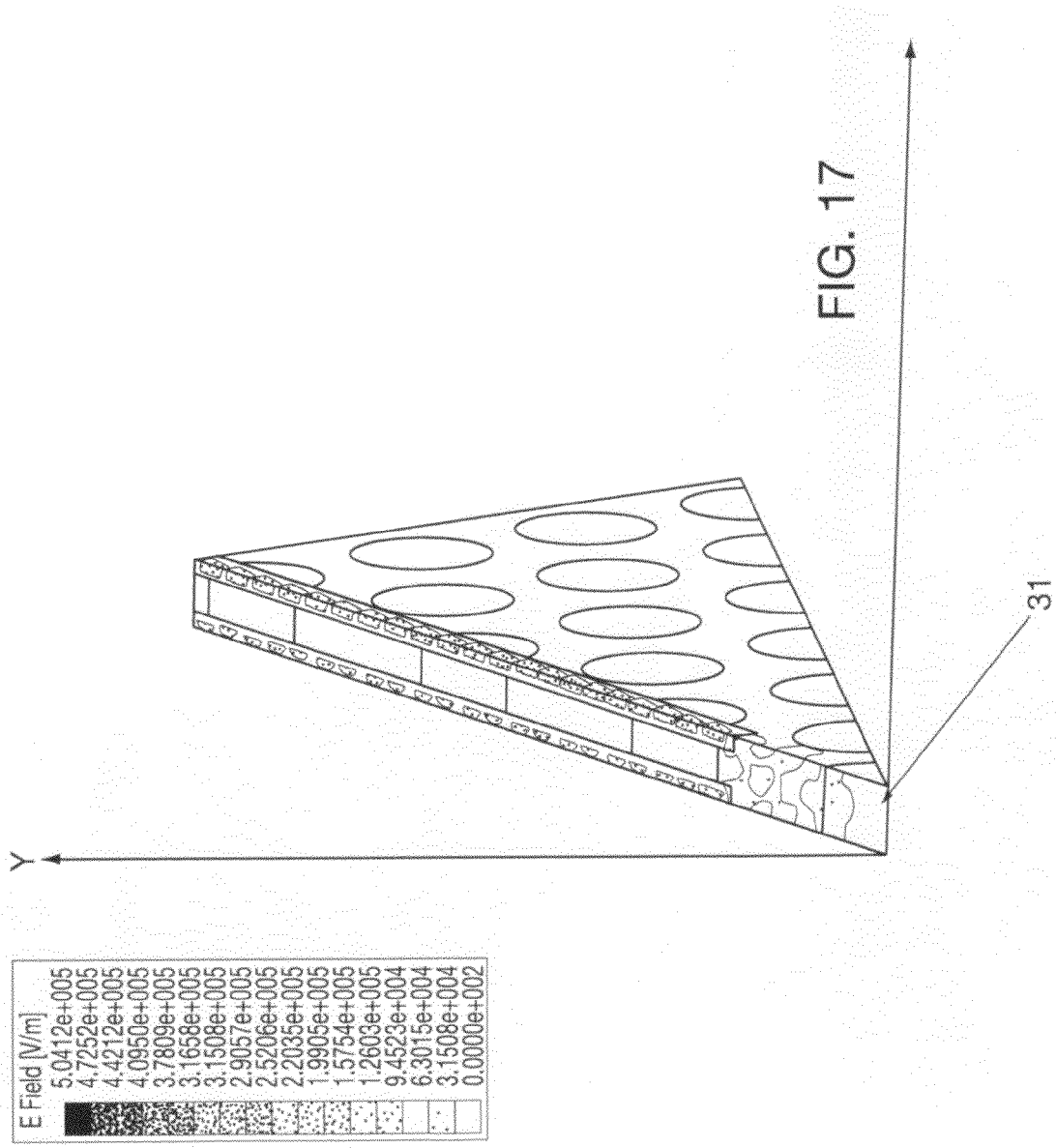

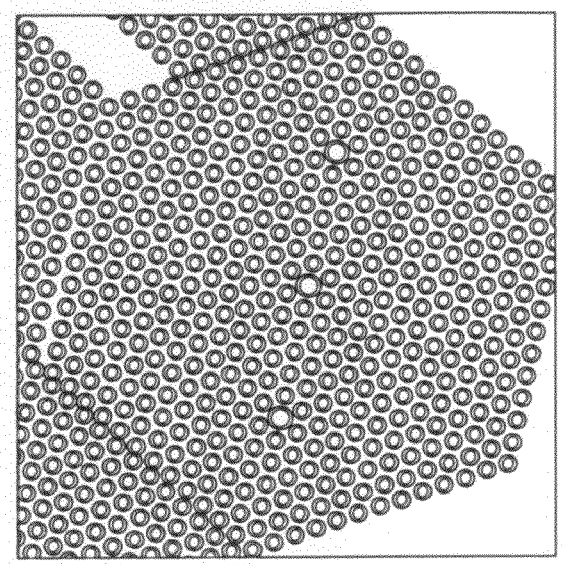
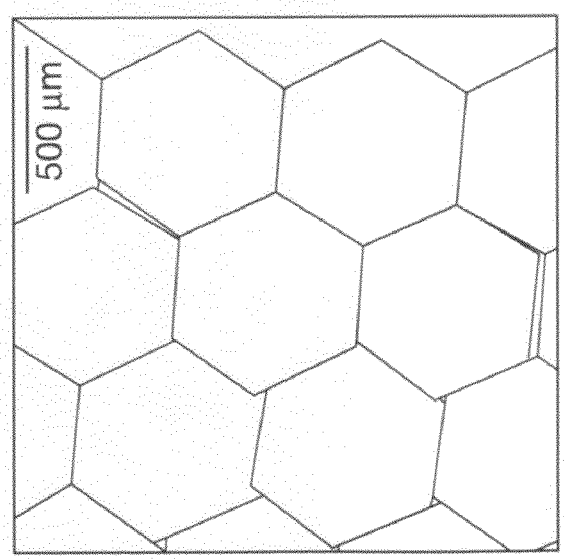
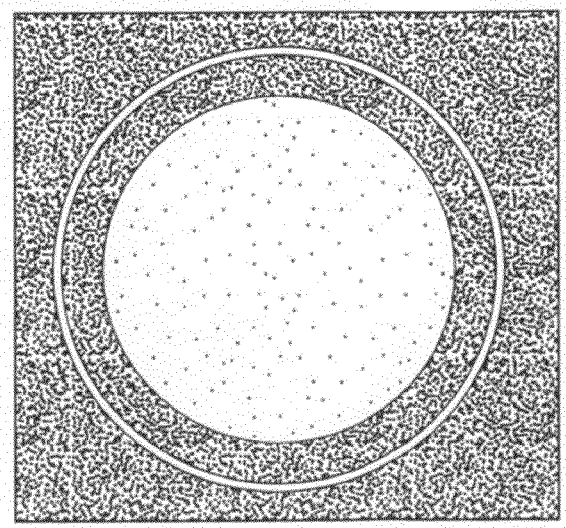
FIG. 25a
FIG. 25b
FIG. 25c

SPECIAL PURPOSE MODES IN PHOTONIC BAND GAP FIBERS

CROSS REFERENCE TO RELATED APPLICATIONS

This is a utility patent application filed pursuant to 35 U.S.C. §111 (a), and claims priority pursuant to 35 U.S.C. §119 from provisional patent application 61/230,292 filed Jul. 31, 2009. The entire contents of the aforesaid provisional patent application is incorporated herein by reference for all purposes.

STATEMENT REGARDING FEDERALLY SPONSORED RESEARCH OR DEVELOPMENT

This invention was made with Government support under Contract No. DE-AC02-76SF00515 awarded by the Department of Energy. The Government has certain rights in this invention.

BACKGROUND OF THE INVENTION

1. Field of the Invention

This invention relates to the general field of photonic band gap (PBG) fibers, more particularly to the excitation, propagation, control and use of various electromagnetic modes in PBG fibers and to structures of PBG fibers facilitating same. Most particularly, some embodiments relate to the acceleration and control of electrons moving axially along one or more PBG defects, leading to an improved source for electron beams having useful and improved characteristics, advantageous for a variety of applications.

2. Background and Related Art

The confinement and propagation of electromagnetic energy along fibers is a key technology in many important areas of the modern economy including communications, detection, sensing, probing (often remotely or within a patient for medical purposes), as well as many other areas of application. Perhaps the most common technique for confining electromagnetic waves within a fiber is total internal reflection, typically involving an optical fiber having a central axial strand of material surrounded by a cladding layer in which the central strand has a higher index of refraction (or "index") than the index of the surrounding cladding layer. This arrangement of a high index axial strand surrounded by a low index cladding is constructed so as to cause electromagnetic waves propagating along the central strand and striking the strand-cladding interface at a glancing angle to undergo total internal reflection and thereby to remain propagating within the axial strand. The lower index of refraction in the cladding can be achieved by using a cladding material with inherently lower index than the material comprising the axial strand, or fabricating the cladding with numerous gaps, inclusions or other regions of low index such that the effective index of the total cladding structure is less than that of the axial strand.

However, the limitation that the cladding have a lower index of refraction than the axial strand in order to achieve confinement by total internal reflection is a serious limitation for many potential applications. For example, it would be advantageous to propagate a beam or cluster of electrons along a hollow central core (or "defect") of a fiber-like structure concurrently with one or more confined electromagnetic modes such that the electrons gain energy from the electromagnetic mode(s). In such a structure, different modes can be used for bending, focusing and exerting other controls over the electrons. Unfortunately, the effective propagation of electrons requires a space free of material as electrons are scattered and/or captured by encounters with virtually any atom or molecule. No cladding material has a lower index of refraction than a vacuum, so a mode of confinement is required that allows electromagnetic mode confinement and propagation along a fiber having a defect region free of material.

Photonic band gap (PBG) fibers were developed in the 1990's to provide an alternative technique for confining electromagnetic waves within a defect region of an optical fiber. In essence, the defect region of an optical fiber (otherwise containing material with a relatively high index of refraction) can be hollow and air-filled, gas filled, evacuated, or partially evacuated, if it is surrounded by a structure having periodic variations in optical properties serving as the "cladding". It is well known that when waves encounter a periodic structure, certain wavelengths will propagate through the structure while other wavelengths will not, analogous to the formation of electronic energy bands and band gaps that arise when electrons (having wave-like properties) interact with the periodic structure of a crystal lattice. That is, certain wavelengths (or ranges of wavelengths) will propagate through the periodic structure of the cladding and be lost to the propagation of the wave along the defect, while other wavelengths will lie in one of the (possibly several) wavelength "band gaps" and remain confined within the defect region of the fiber. Thus, electromagnetic waves having wavelengths in the range of a "photonic band gap (PBG)" will be confined to the defect region even though this core or defect region has an index of refraction lower than that of the surroundings. An extensive discussion and analysis of the propagation of electromagnetic modes through structures having periodic variations can be found in *Photonic Crystals, 2nd Ed.*, J. D. Joannopoulos et al, (Princeton University Press, 2008), the contents of which is incorporated herein by reference for all purposes.

A typical PBG fiber is depicted in FIG. 1, taken from FIG. 4 of X. E. Lee, "Photonic Band Gap Fiber Accelerator," *Physical Review Special Topics—Accelerators and Beams*, Vol. 4, pp. 051301-1, -7 (2001), hereinafter "Lin". The entire contents of Lin is incorporated herein by reference for all purposes.

FIG. 1 depicts as 10 a dielectric material that includes an array of elements, 11, having different optical properties from the background 10 and are intended to create one or more band gaps, thereby preventing the propagation of electromagnetic modes having frequencies lying in the band gap(s). Elements 11 creating the band gap(s) are typically capillaries running axially through the fiber as depicted in cross-section in FIG. 1 and are referred to herein as "capillaries" or "band gap elements." Material 10 is referred to herein as "background dielectric," "dielectric material," or simply "dielectric."

However, since the central core is a distinct element of the fiber from those typically used as band gap elements 11, (such as a larger hole or absence of one or more band gap elements from an otherwise uniform fiber), analogous to a "lattice defect" as used in solid state physics, central core 12 is also referred to in literature as a "defect," "core defect," "central defect" and the like. These terms are typically used interchangeably to describe the central region of a PBG fiber, that is "central core," "central region," "defect," "core defect," and "central defect" are used without distinction. Essentially all fibers discussed herein are PBG fibers lacking high index material in the central core and will be so understood unless clearly indicated otherwise. Thus, it is customary in the field of PBG fiber technology to refer to the central core 12, having a different geometry from the surrounding capillaries 11, as the "central defect" or "defect."

In addition, many of the PBG fibers considered herein pursuant to some embodiments of the present invention have more than one propagation region (defect), with some or all of such defects displaced from the central axis of the PBG fiber. Thus, "core" and "central core" and the like may carry the (erroneous) implication that the central axial region of the PBG fiber is intended when that is not necessarily the case. For clarity and economy of language we refer to such region (s) of propagation as the "defect" or "defects" understanding that a defect may, but need not, be located along the central axis of the fiber.

It is important to appreciate that, in contrast with the special modes discussed herein, PBG fibers used in telecommunications generally make use of electromagnetic modes largely confined to a PBG central defect, 12, for carrying information along the fiber. In contrast, the modes useful for different applications, such as electron acceleration, guidance and control as discussed herein, typically involve defect/surface modes in which the modes are not completely confined in the defect but in which important contributions to the performance of the PBG fiber arise from electric and magnetic fields ("fields") lying outside the defect in the region of dielectric 10 and band gap elements 11. To be precise, we express the electromagnetic modes propagating axially along the PBG fiber (whether or not along the central axis) as propagating "in the region of, in the vicinity of, in the neighborhood of the defect," reserving "in the defect" for those modes actually lying substantially within defect 12.

The creation, acceleration, control and use of electron beams by means of PBG fibers is one application for the technology described herein, and is expected to be an important practical example. In such cases, it is anticipated that laser light will be an advantageous source of the required electromagnetic energy. However, that is not an essential limitation and electromagnetic radiation outside the visible portion of the spectrum, and derived from sources other than lasers, are included within the scope of the present descriptions. For economy of language, "laser" or "light" is used herein to indicate general electromagnetic energy not necessarily limited to visible portions of the spectrum. Those with ordinary skills in the art will clearly realize when other wavelengths can be utilized for different purposes in appropriate circumstances.

The dielectric material 10 is depicted in FIG. 1 as a uniform background in which an array of other elements are embedded, typically band gap elements or capillaries, 11. While this is a typical structure for PBG fibers currently in use, it is not a fundamental limitation. Regions of different material having different optical properties can also be employed in place of a substantially uniform background dielectric 10, providing additional design parameters for making the properties of the PBG fiber precisely as desired. However, to be concrete in our descriptions, we describe the typical case in which 10 represents a substantially uniform dielectric material.

The periodic array of band gap elements or capillaries 11 is depicted as a hexagonal array in FIG. 1, but that is not an essential limitation. A hexagonal pattern provides advantageous packing or close packing for the arrangement of capillaries 11, and also is conveniently manufactured with present fiber fabrication technology. To be concrete, many of the descriptions herein depict or describe hexagonal patterns for capillaries 11, but other arrangements, such as square, may also be used advantageously in some cases, and are included within the scope of the present descriptions.

Central defect 12 as depicted in FIG. 1 denotes the central, axial region of the PBG fiber within which, or within the vicinity of which, electromagnetic radiation with appropriate wavelength(s) typically propagates (at least for those cases lacking multiple defects). To be precise in our terminology, we use "strand" or "central strand," "axial strand" and the like to indicate the central light-carrying region of a conventional optical fiber confining light by means of internal reflection at the strand-cladding interface with a higher index strand surrounded by a lower index cladding. In other words, "strand" or phrases including "strand" are used herein to denote a light-carrying fiber structure having material with relatively high index of refraction along its central axis. We distinguish the central region of PBG fibers as "central defect (core)," "central defect (core) region," and the like to indicate the central axial region of a PBG fiber lacking high index material, typically evacuated or partially evacuated, but may optionally contain low index material such as air or other gases.

The mechanism confining electromagnetic radiation to the vicinity of the central core of a PBG fiber does not require material to be present in the core, so one may envision including within the core substances that interact with the confined radiation to produce advantageous results. For example, Lin proposes that a properly constructed PBG fiber having radiation propagating along the central core has the potential to provide an effective electron accelerator. Whereas conventional electron accelerators are capable of adding energy to the accelerated electrons at about 50 MeV/m ($50 \times 10^6$ electron volts per meter), even estimating performance of superconducting accelerators, a PBG fiber accelerator ("PBG accelerator") has the potential to impart energy at the rate of more than about 1 GeV ($10^9$ ev)/m. Thus, PBG accelerators may provide a very compact, perhaps portable, accelerator.

To be concrete in our descriptions, we presume that electrons are the particles to be accelerated in a PBG accelerator, understanding thereby that this is by way of illustration not limitation since any charged particle in the PBG's defect region will interact with the electromagnetic fields therein, potentially producing useful effects. In particular, positive charged electrons (positrons) can make use of PBG accelerators in a manner very much like electrons and with the same structure as an equivalent PBG electron accelerator. Positrons are already useful in medicine, for example, in positron emission tomography.

Clearly, it is important to be able to insert electromagnetic energy into the defect region of a PBG fiber in sufficient quantity and having the desired electromagnetic field structure. In other words, electromagnetic energy must be coupled into the fiber in such a way so as to excite the electromagnetic modes desired and do so as efficiently as is reasonably possible.

Thus, a need exists in the art for improved structures, devices, materials and procedures for exciting, propagating and controlling various electromagnetic modes with defect region(s) of a PBG fiber so as to produce desired effects therein, including acceleration and control of charged particles, for an improved source of electron beams having one or more advantages of high energy, compactness, low cost, among others.

BRIEF SUMMARY OF THE INVENTION

Accordingly and advantageously, some embodiments of the present invention provide PBG fibers containing more defect regions through which charged particles can be accelerated, guided, controlled, extracted and otherwise used for a variety of applications. Computer calculations of the performance of PBG accelerators indicate that, in comparison to conventional particle accelerators, much larger field gradients can be achieved, hence much larger particle energies can be achieved in a smaller region. Other embodiments include several axial defect regions in parallel along the PBG fiber, allowing increased intensity to be achieved by means of multiple accelerating beams in a single PBG fiber. These and other advantages are achieved in accordance with the present invention as described in detail below.

BRIEF DESCRIPTION OF THE DRAWINGS

Unless otherwise noted, the figures presented herein are schematic and not to scale, and the relative dimensions of components depicted in various figures are also schematic and not to scale. All data depicted is derived from computer simulations unless stated otherwise.

FIG. 17: This depicts computed electric field strengths $E_z$ for an input coupler and output coupler separated by $\lambda/2$ as depicted in FIG. 17.

FIG. 25: Photomicrographs at different magnifications of a thin sliced wafer for the PBG accelerating mode, manufactured for the SLAC National Accelerator Laboratory by Incom, Inc. of Charlton, Mass.

DETAILED DESCRIPTION

The present invention relates to PBG fibers and the excitation of special purpose modes of electromagnetic radiation in and near one or more defects. While propagation of electromagnetic radiation has been well studied in PBG fibers for telecommunications, exciting other optical modes for special purposes, such as charged particle acceleration, is much less understood. We describe herein PBG fibers and the excitation of such modes including techniques for the excitation, control and use of such modes, and several potential applications. PBG fibers containing several defects are also studied including possible deleterious coupling between the electromagnetic fields existing in neighboring defects. Possible effects on electromagnetic fields in defects due to the proximity of the edge of the PBG fiber are also studied. Unless stated otherwise, all results presented herein have been obtained by computer simulations.

We present numerical simulations of electromagnetic fields generated under a variety of conditions for a variety of PBG fibers having various configurations of defect(s), a variety of structures for coupling electromagnetic energy into the central core region, exciting thereby particular modes. The CUDOS code is available through the University of Sydney and was used for many of the simulations described herein. We focus attention on the particular examples of electromagnetic fields that are expected to be useful for the application of accelerating electrons along one or more defects of various PBG fibers. These simulations are by way of illustration and not limitation since modifications and other applications would be readily apparent to those having ordinary skills in the art. However, we direct our chief consideration to beams of electrons which are expected to be among the early applications of this technology.

To be concrete in our detailed description, we typically discuss the specific example of coupling laser energy into and through a PBG fiber defect (and possibly interacting with electrons or other charged particles therein) as illustration and not limitation. Those having ordinary skills in the art will readily appreciate that the techniques, structures and materials described herein can readily be modified in a straightforward manner and applied to the utilization of other forms of electromagnetic radiation with PBG systems whose defect or defects (hereinafter "defect(s)") contain charged particles other than electrons.

Figure 7:
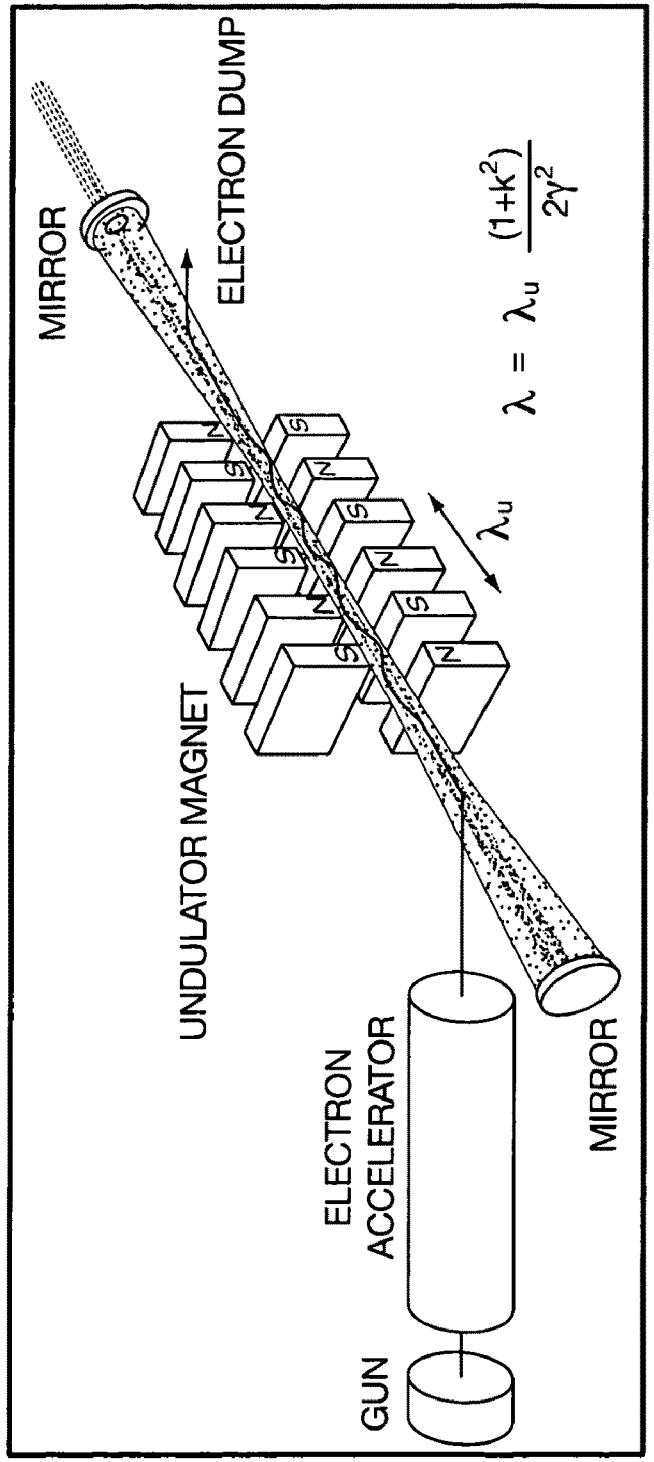
FIG. 7: Schematic depiction of potential free electron laser employing an electron accelerator pursuant to some embodiments of the present invention.
Figure 8:
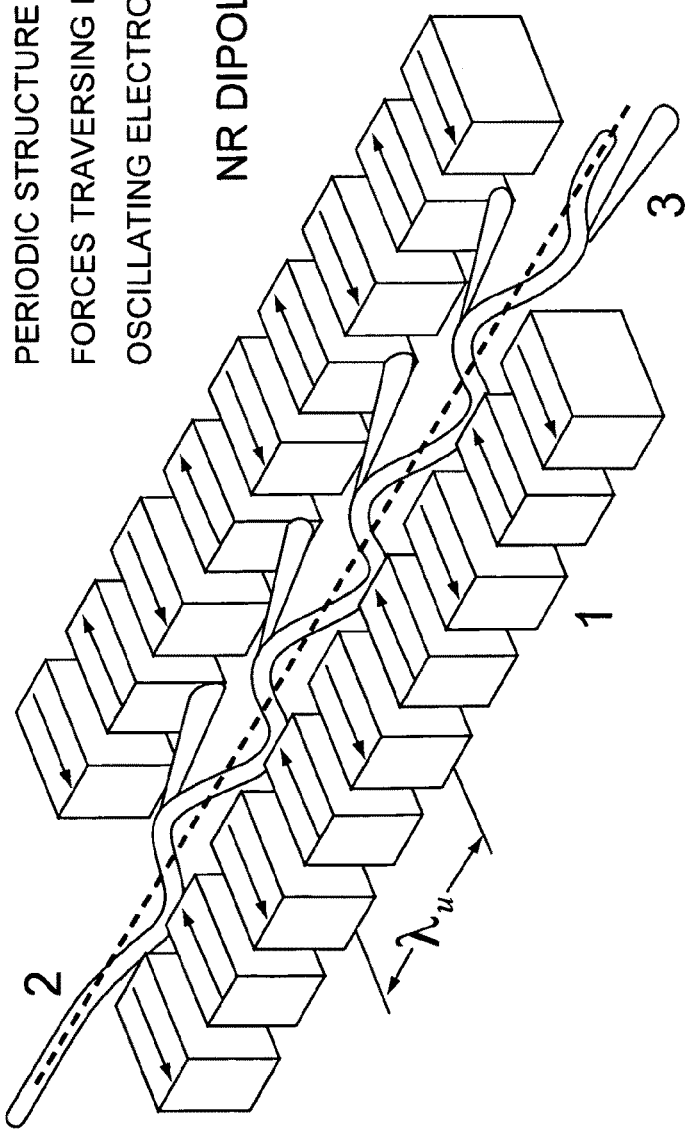
FIG. 8: Schematic depiction of electromagnetic radiation produced by an electron beam from an electron accelerator pursuant to some embodiments of the present invention.

In principle, the electromagnetic fields confined within the region PBG fiber defect(s) will interact with any charged particle also present in the central core. However, it is envisioned that electron acceleration by a PBG accelerator is likely to provide one of the first practical applications for this technology. Energetic electrons produced by conventional accelerators can be used to produce intense bursts of synchrotron radiation, often in the form of X-rays, capable of being used to study the structures of materials and for numerous other purposes. Energetic electron beams can be caused to wiggle by passage through an "undulator", typically an array of magnets causing the beam to deflect in alternating directions, for example, as depicted in FIG. 8. The resulting radiation can be arranged in a cavity to produce a free electron laser (FIG. 7) that can be used for numerous purposes such as to produce laser radiation or, for sufficiently energetic electrons, even an x-ray laser.

Figure 9:
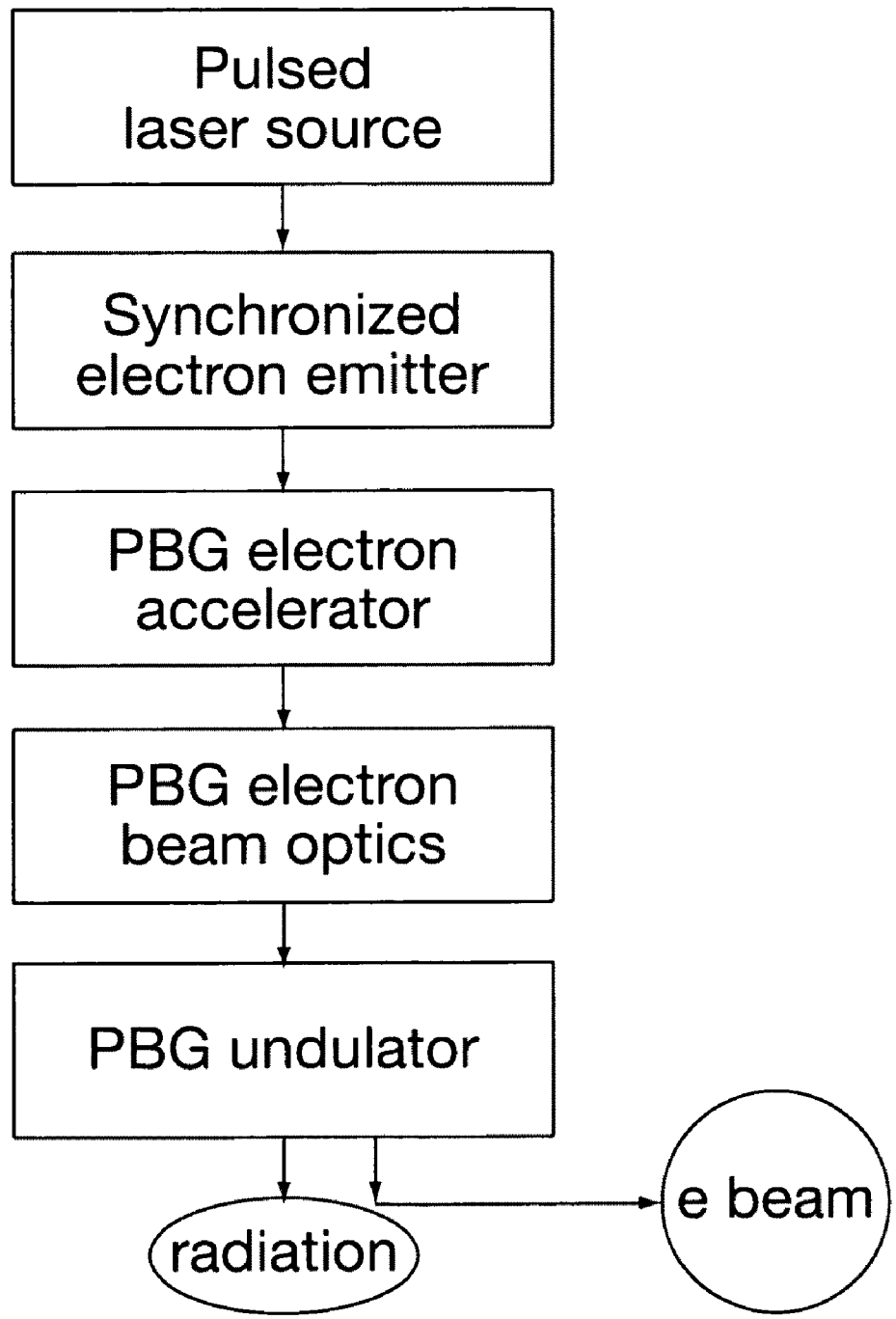
FIG. 9: Block diagram of potential radiation source employing PBG electron accelerator.
Figure 10:
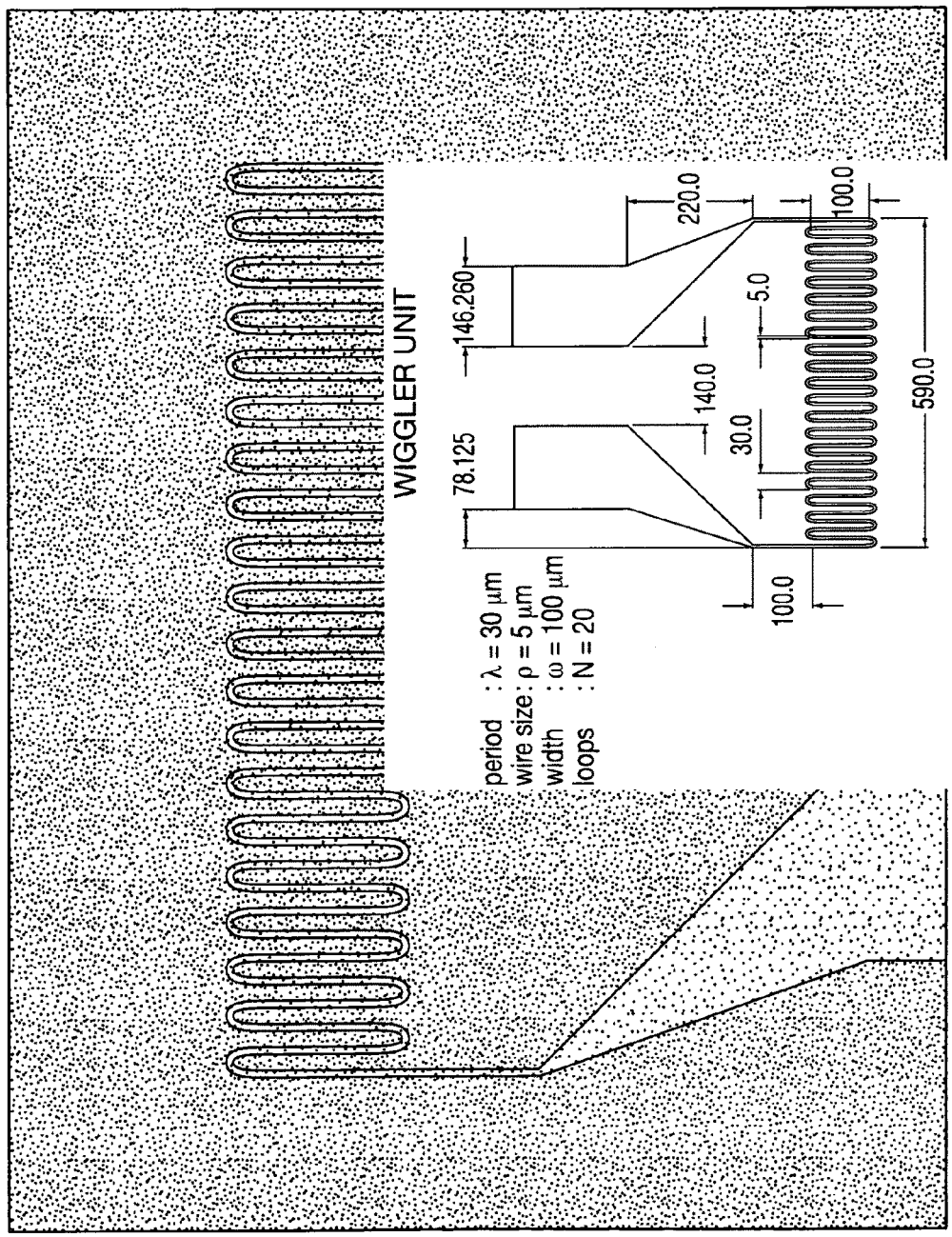
FIG. 10: Schematic depiction of a portion of a microundulator in a current-dominated configuration.

It is also envisioned that accelerator and lab on a chip depicted schematically in FIG. 9 can be combined with a microundulator unit (or "wiggler") to provide radiation from the accelerator on a chip. One example of such a microundulator is depicted schematically in FIG. 10 in a current-dominated configuration.

Table 1 is a list of a few candidate PBG fibers, F1-F7, including those for which numerical simulations are presented. 2-Dimensional simulations were performed which are expected to give an adequate description of electric and magnetic fields based on presumed cylindrical symmetry. The fibers F1-F7 of Table 1 have the basic geometry of the fiber depicted in FIG. 1. In Table 1, n is the index of refraction of the dielectric material 10 given in the column labeled "Material" in Table 1. $n_{eff}$ is the effective (complex) index of refraction. $\lambda$ is the free space wavelength of the electromagnetic mode appropriate for accelerating electrons in the defect (in μm, 1 μm=$10^{-6}$ meter). r is the radius of the capillaries or outer cylinders (band gap elements). R is the defect or central core radius, p is the pitch (that is, the center-to-center spacing of the outer cylinders, 11). $N_{missing}$ is the number of capillary rings, or cylinders, removed from the center of the fiber to construct the central defect, that is, one capillary ring (comprising one capillary) removed for $N_{missing}$=1, and 7 capillaries removed (1 for first ring+6 for second ring) for $N_{missing}$=2.

Figure 2:
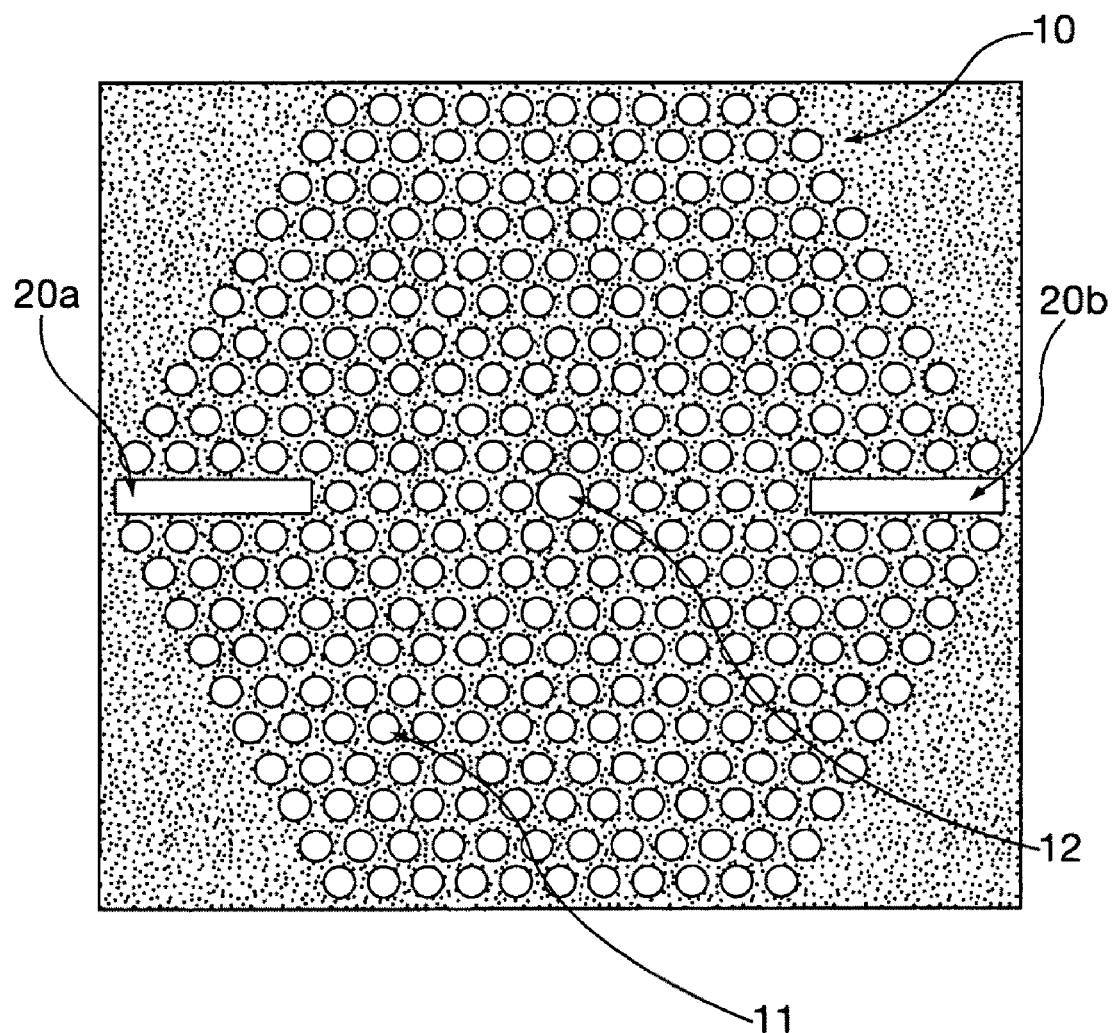
FIG. 2: A cross sectional depiction of a PBG fiber viewed along the axial direction of a CAD model of the fiber F2 with the addition of coupler sections 20a and 20b depicted schematically. This figure depicts a central defect cavity 12 for electron beam passage and acceleration. The background 10 is taken to be fused silica and 11 is free of material. For the simulations described herein, coupler sections 20a, 20b were omitted, unless stated otherwise.

FIG. 2 is a cross sectional depiction of a computer aided design or CAD model for fiber F2 with a central defect or central core cavity for electron beam passage and acceleration. The white background, 10, in FIG. 2 is taken to be fused silica and the red areas 11 are free of material. Possible coupler sections at the entrance and exit are also depicted as 20a, 20b, which can be largely free of material as coupler gaps or slots, or filled with a suitable (typically dielectric) material. Unless otherwise stated, the numerical computations described herein did not include 20a and 20b.

Figure 3:
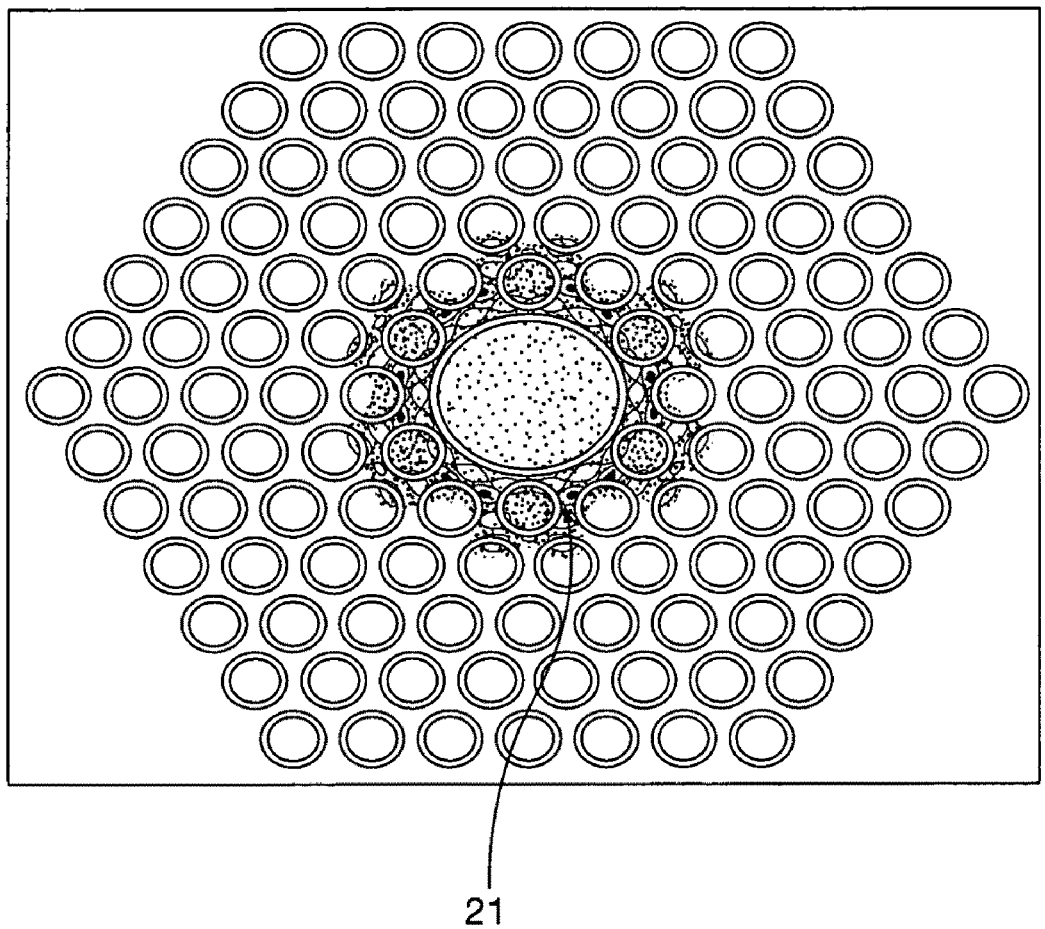
FIG. 3: A cross sectional depiction of the electric field in the z-direction $E_z$ (perpendicular to the figure) for the ($\lambda/2$) acceleration mode computed for fibers F6, F7. The colors indicate the magnitude of $E_z$, increasing from blue to green to yellow to orange to red.
Figure 4A:
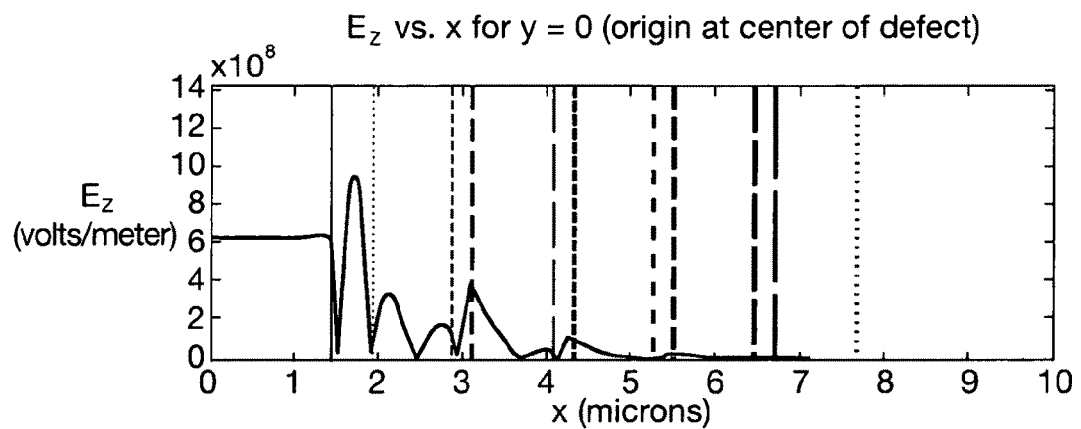
FIG. 4: A graphical depiction of $E_z$ from FIG. 3 along two orthogonal coordinate planes, along x for y=0 (4a) and along y for x=0 (4b). In both cases the origin of coordinates is taken to be the center of the central core 12. y=0 is in the horizontal direction in FIG. 3 while x=0 is in the vertical direction. The vertical lines indicate the locations of the boundaries between the silicon 10 and the holes 11 and the blue wavy line in 4a and 4b gives the $E_z$ field strength. The particular colors used in FIG. 4 have no significance.
Figure 4B:
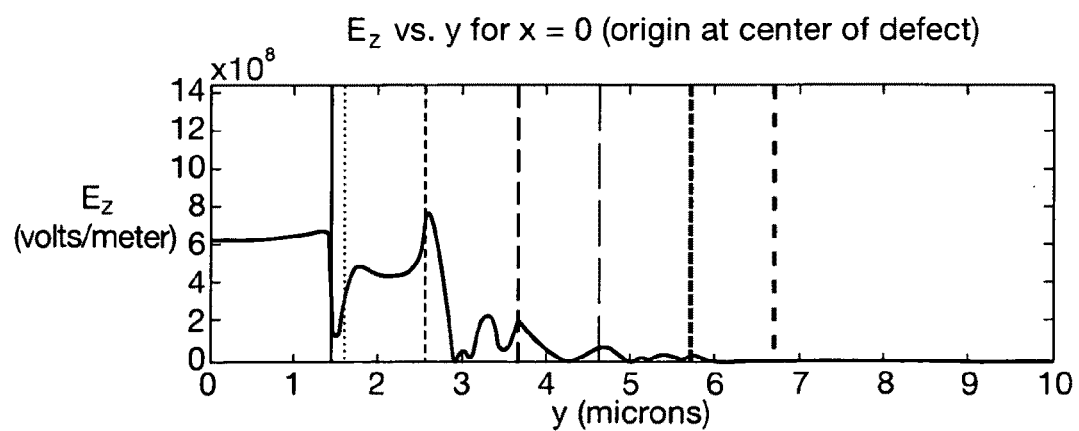

One salient characteristic of PBG fibers pursuant to some embodiments of the present invention is apparent in FIGS. 3, 4a and 4b. FIG. 3 is a cross sectional depiction of the electric field in the z-direction $E_z$ (perpendicular to the figure) for the acceleration mode computed for fibers F6 (scaled down by the wavelength ratio) and F7. The colors indicate the magnitude of $E_z$, increasing from blue to green to yellow to orange to red. FIGS. 4a and 4b depict $E_z$ along two orthogonal planes. The colored vertical lines delineate boundaries between the silicon and holes such that the central defect lies in the region from the origin at x(y)=0 out to the first vertical line at about x(y)=1.4 μm. The near uniformity of the acceleration field in this central defect region is clearly evident in FIGS. 3, 4a and 4b.

We note in FIG. 3 that the maximum $E_z$ occurs in the silicon material at a number of "hot spots" 21 indicated by the red spots in FIG. 3. Thus, the maximum electric field gradient that is achievable with this fiber is limited by the breakdown field at the location where breakdown first occurs. The achievable gradient based on the breakdown field in Si is about 0.6 GeV/m.

While FIGS. 3, 4a and 4b show results for a $TM_{01}$-like accelerating mode having a very high axial or longitudinal field into the plane of the page (and is approximately uniform within the central defect where the particle beam passes), other types of fields will be useful for focusing, guiding or otherwise directing the electron beam, typically in higher order fields. In particular, a sextuple field is advantageous for precise focusing of electron beams as needed for high resolution lithography, high resolution electron microscopy and other uses.

Figure 5:
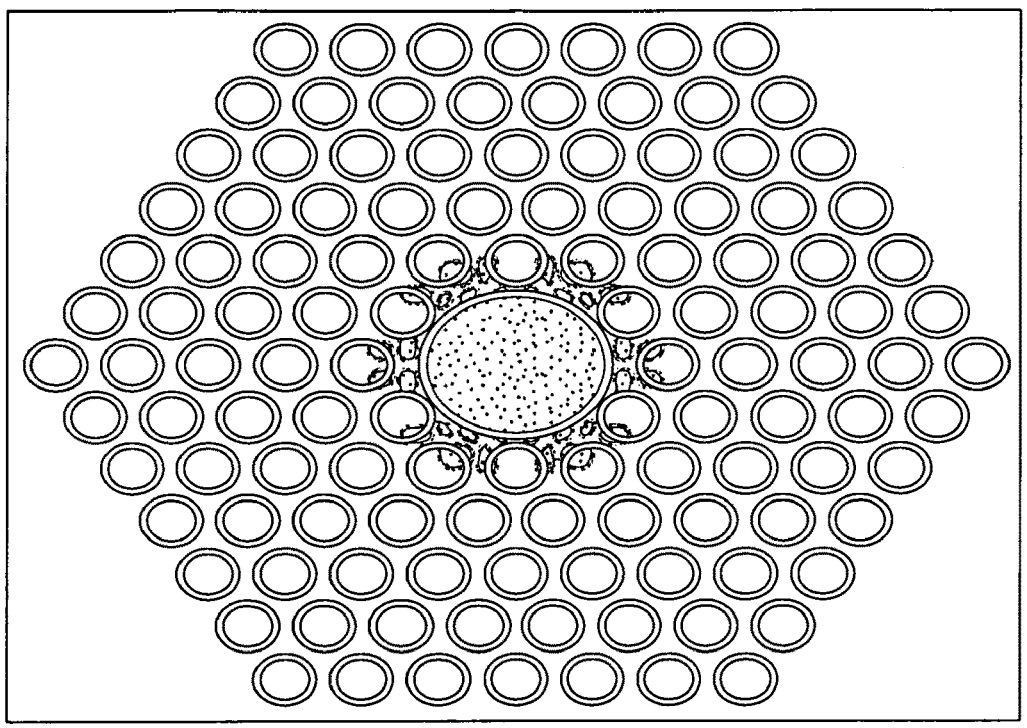
FIG. 5: A cross sectional depiction of the electric field in the x-direction $E_x$ for the sextuple mode computed for fibers F6, F7. The color coding is the same as FIG. 3.
Figure 6A:
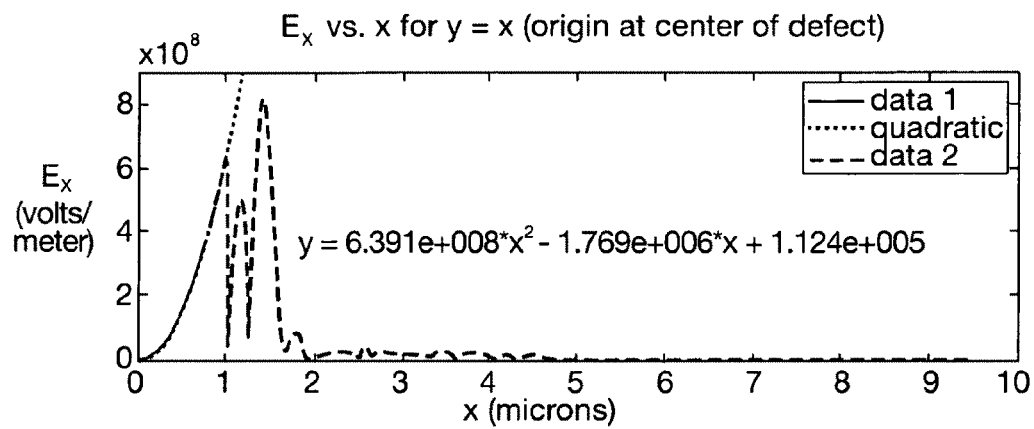
FIG. 6: A graphical depiction of $E_x$ vs. x along the line y=x (6a) and y=−x (6b) for a sextuple mode in fibers F6, F7.
Figure 6B:
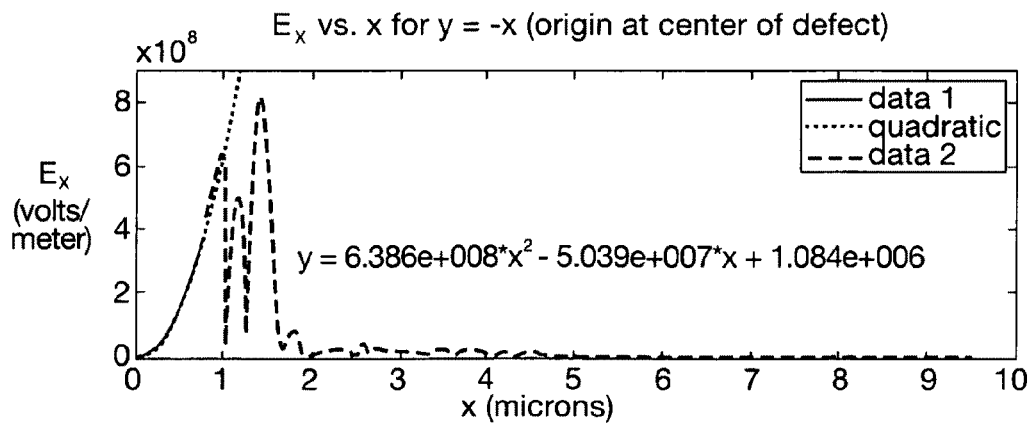

FIGS. 5, 6 show results for a rotated, transverse, electric sextuple mode. FIG. 5 depicts $E_x$ for the sextuple mode in fiber F6 using the same color coding as FIG. 3. FIG. 6 depicts $E_x$ vs x along the line y=x (6a) and y=−x (6b) for the sextuple mode in fiber F6. Fits were done on the data within 80% of the radius of the central core or defect. The curve is well fit with $E_x$=6.4C$x^2$.

The results provided herein demonstrate that PBG accelerators have the potential to be, an important extension and improvement of conventional RF accelerators and have the potential to increase significantly the frequency and accelerating gradients achievable, as discussed in more detail below.

The electromagnetic energy delivered to the PBG fibers may be arranged so as to be delivered into modes leading to acceleration of the electron beam ("accelerator modes") as well as into optical modes that can be used for beam steering, focusing and a variety of control functions. In some embodiments, both accelerator modes and other modes can be excited in the PBG fiber by the same coupling mechanism.

That is, the intensity and other characteristics of the laser radiation coupled into the PBG fiber control the accelerating gradient as well as the strength of at least one of the excited optical modes for a sufficiently broadband source. Thus, tuning the laser power used to excite these modes, and/or using lasers producing different wavelengths, can provide different patterns of excitation in various modes. Other embodiments use different laser frequencies to excite different modes, for example, modes lying in distinct band gaps of the PBG fiber leading to independent tunability of modes.

Lasers are expected to provide the drive power for PBG accelerators and play a role similar to that of klystrons in conventional accelerators. The PBG accelerators discussed herein are composed of dielectric materials that typically allow much higher breakdown fields than are ordinarily possible with conventional copper cavities. Thus, much higher accelerating gradients and control fields can be applied depending upon the materials used, e.g. fused silica is expected to give up to an order of magnitude improvement over silicon.

Excitation of various modes in PBG accelerators can be achieved by means of lasers matched to the coupling modes to be excited, e.g. TM-like for acceleration or TE-like for focusing. Coupling into and out of the PBG structure is achievable in some embodiments of the present invention by means of thin coupler slots, disks or sections, typically located at the entrance and exit. These sections can be integral to the accelerating structure or separated from it. These sections can be made by a variety of techniques, in a variety of configurations, allowing these sections to perform other or additional functions such as electro-optical functions or other insertions, for example, a free electron laser, among others, but also including conventional lasers.

The embodiments of electron accelerators with PBG fibers as described herein offer considerable flexibility in design and control. In addition to the design of the PBG fiber itself, various insertion or control disks can be employed. That is, specially designed insertion disks can be made part of the PBG fiber to affect the electron beam in desirable ways. One example is the delivery of energy to the beam from a direction transverse to the beam direction by means of coupling slots (20a, 20b) or other waveguide or cavity-like elements surrounding the beam into which laser energy is directed. The location, position, geometry and material(s) of such cavities can be adjusted to deliver energy preferentially to one or more desired modes.

However, insertion disks can also be used to control the electron beam in many other ways such as focus, deflect, extract or otherwise exert beam control. Some examples are given in FIG. 11 in which control elements are fabricated directly into the central defect or central core of the PBG fiber which then can be assembled into a stack of arbitrary length. Similar control elements can be used for the laser beam or pulse, e.g. to produce it, to regenerate it, and/or to control its phase relative to the electron bunch.

It is important to consider in connection with insertion discs a question that arises when addressing the relative synchronization of joint laser and electron beams. For concreteness, we again consider the specific case of electrons in some detail with the idea that this is an illustration, not a limitation, and can be modified, extended and applied to many other cases.

Of particular relevance is a component referred to herein as a "disk phase shifter," or an insert that has the basic PBG fiber structure that supports an accelerating mode but is perturbed in such a way as to increase or decrease the local effective index in the vicinity of the defect. This can be done in several ways e.g. by introducing additional capillaries close to the defect or by changing the material(s) in the vicinity of the defect—possibly by loading some of the capillaries with material, not necessarily the same material(s) in every capillary so loaded. We note that "loaded" as used here does not necessarily mean material(s) added to capillaries after the fiber is constructed (although that is included), but also includes fibers originally fabricated with different capillary properties in the vicinity of the defect. The greater the change in optical properties in the vicinity of the defect, the greater the effect that is expected.

Mathematically, let $\beta$ represent the longitudinal propagation constant, possibly complex, for the unperturbed solution where the phase velocity is $v_p = \omega/\beta = c/n_{\it eff}$. It then can be shown that the perturbed propagation constant $\beta + \beta k \eta \delta n(x,y)$ where k is the free space wavenumber of the mode and $\eta$ is the overlap efficiency between the power density of the unperturbed case (Poynting vector) and the index perturbation. If the mode's wavenumber in the fiber is $k_z$ then $k_z = k\, n_{\it eff}$ and the group velocity is $$v_g = d\omega/dk_z = c/(n_{\it eff} + \omega dn_{\it eff}/d\omega).$$

To maximize the mode's group velocity for a better match to that of relativistic particles, one wants to minimize both $n_{\it eff}$ and its derivative e.g. by reducing the fractional amount of glass in the lattice and also making the dispersion (proportional to the second derivative) zero.

This example distinguishes an important difference between the other modes such as relevant in the telecom field and those of interest here based on the constraints imposed by the particle beam. Thus, since the PBG group velocities in our examples are $v_g/c \sim 0.6$, this is matched to an electron kinetic energy of only 128 keV. While there are many important applications lying below this energy such as SEMs it is clear that we may have to phase slip the two beams relative to one another quite often. The virtue of this approach for a higher energy accelerator is that it allows a very efficient test or prototyping procedure to implement along an accelerator for a variety of uses beyond simply trying to optimize an accelerator into a fixed monolithic structure.

Figure 11:
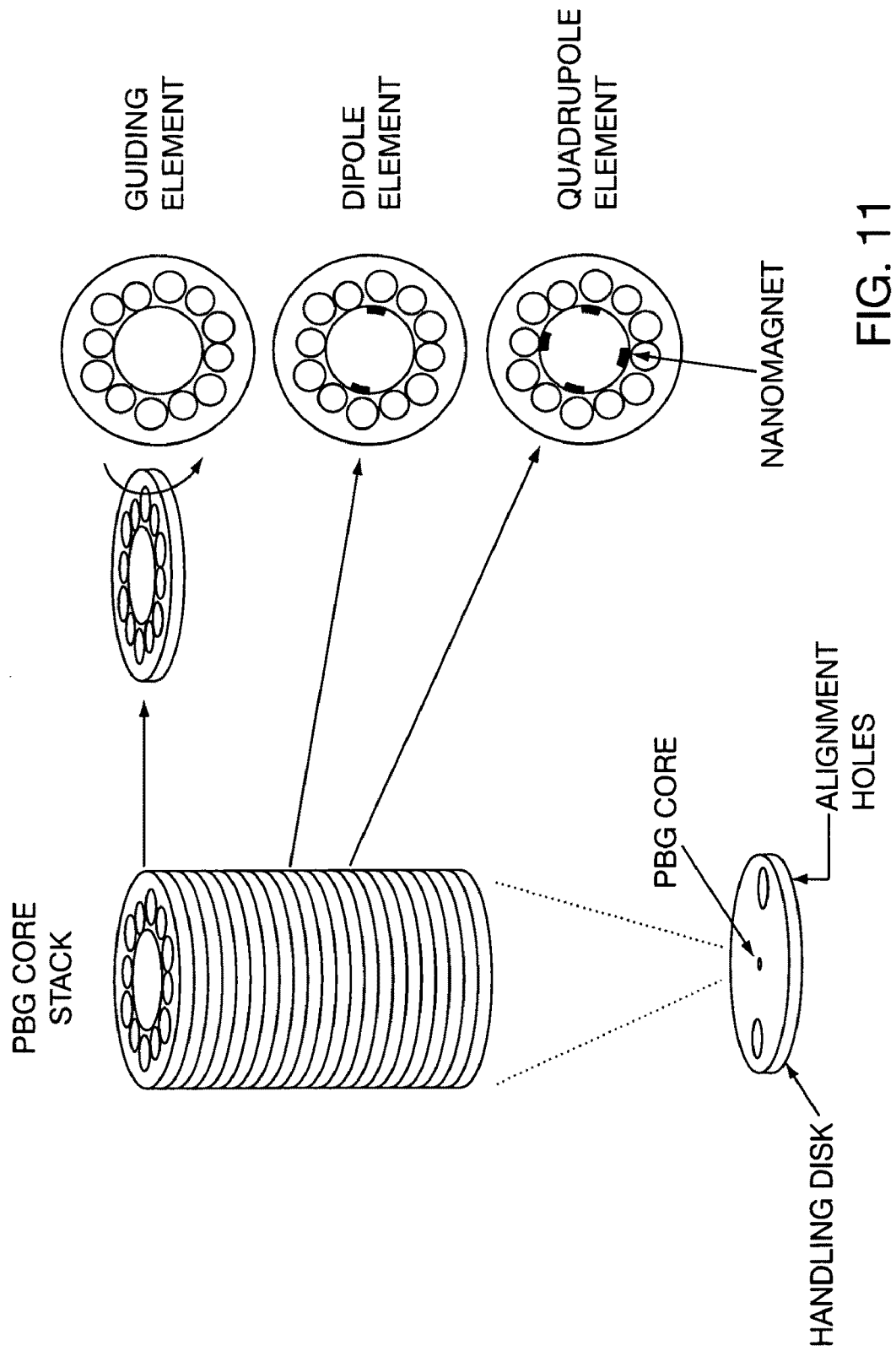
FIG. 11: A schematic depiction of a linear array of PBG fibers into a stack having various control and guiding elements.

In addition to insertion disks having integrally-fabricated control elements in the central defect as depicted in FIG. 11, control elements can be located outside the central core of the PBG fiber and, in fact, on the external surface of the fiber itself. Control elements residing outside the central core can be fabricated so as to be able to couple more easily to sources of voltage, current, laser light, etc. from outside the fiber assembly, thereby allowing some characteristics of the PBG fiber system to be controlled from locations external to the fiber assembly.

A single PBG fiber accelerator lattice (or matrix) producing parallel bunches of accelerated electrons can also be used to produce multiple serial bunches of electrons. Use of a high repetition rate laser has the capability of producing such multiple serial bunches of electrons likewise at a high repetition rate. Also, it is anticipated that multiple beams of bunched electrons might also be propagated in parallel through a multiple defect array within a single, suitably-configured PBG fiber. Alternatively, it is envisioned that multiple electron beams can also be produced in parallel by bundling multiple PBG fiber accelerators into a single, compact structure, typically having multiple correlated lasers directed thereon, thereby multiplying the beam power that is obtainable. That is, the energy of each beam is determined by the beam acceleration characteristics of each individual PBG fiber. The power obtained (volts x current) substantially increases as the beam current is increased through the use of multiple, parallel beams. Increasing beam power typically reduces the time required for procedures employing electron beams. In addition, some applications call for multiple electron beams for parallel processing (e.g. lithography), material processing or pellet compression, among other applications naturally obtainable with a multiple PBG structure.

Figure 12:
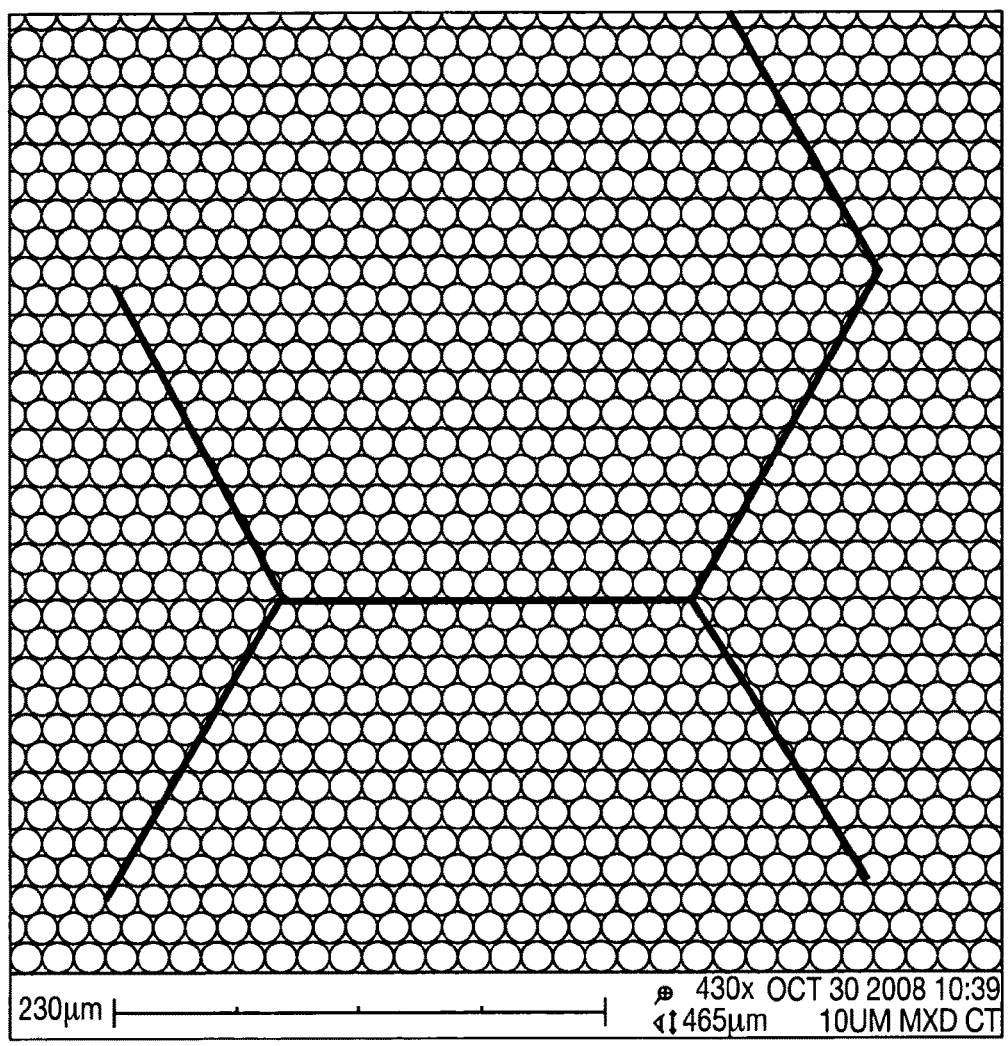
FIG. 12: Schematic cross sectional depiction of typical bundle of PBG fibers. The central core region of each PBG fiber in the bundle is not depicted.

FIG. 12 depicts an end view of a fiber bundle which is a prelude to the fabrication of parallel PBG fibers. It is envisioned that the separate PBG accelerators will have hexagonal geometries and be closely packed, substantially as indicated by the hexagonal areas delineated in FIG. 12. The central cores or defects were not created in the bundle of FIG. 12 (nor depicted therein), chiefly because the fiber "pull" resulting in FIG. 12 was intended as a test for achievable dimensions rather than a full PBG fiber bundle fabrication.

It is envisioned that the full PBG fiber bundle structure, generalized from FIG. 12, will allow for a degree of independent control over the characteristics of the individual beams emerging from the structure. For example, a parallel array of serial PBG structures as depicted schematically in FIG. 11 could allow for some independent control of the parallel beams by means of various control structures in some or all of the serial PBG components assembled into the PBG bundle of FIG. 12. Some examples of possible control structures are depicted schematically in FIG. 11.

Figure 24A:
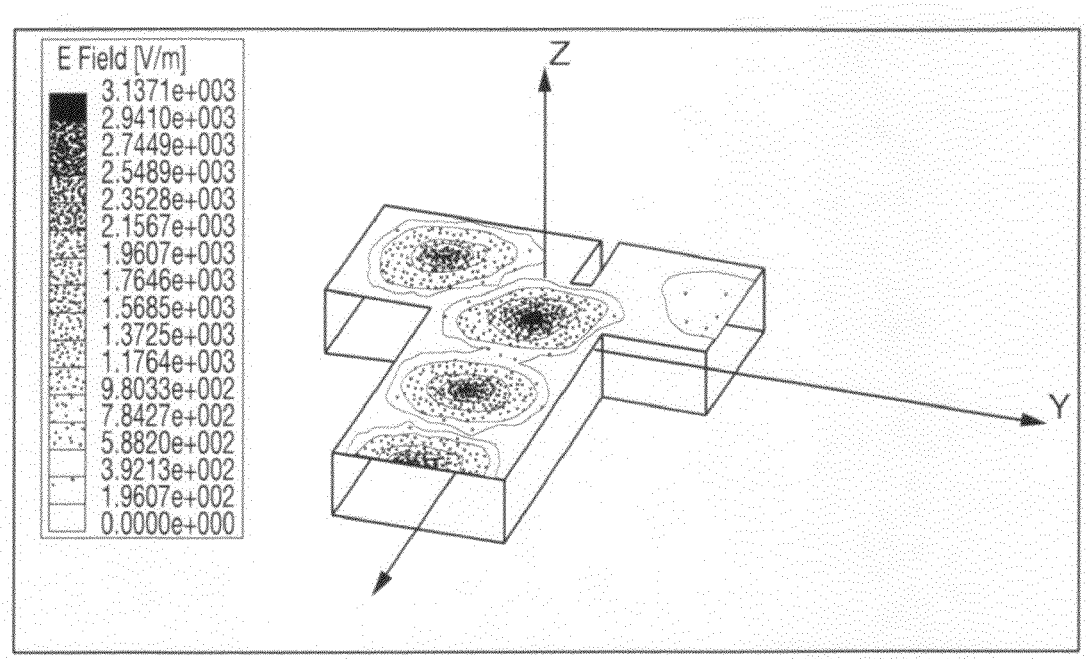
FIG. 24: $E_z$ values computed for a rectangular waveguide coupler: (A) a directional coupler using a slot septum (not optimized). (B) a pass-through coupler (not optimized) that is usable either for exciting a linear array or specific combinations of defects when dynamic elements are added that are equivalent to mirrors or septa as in 24(A).
Figure 24B:
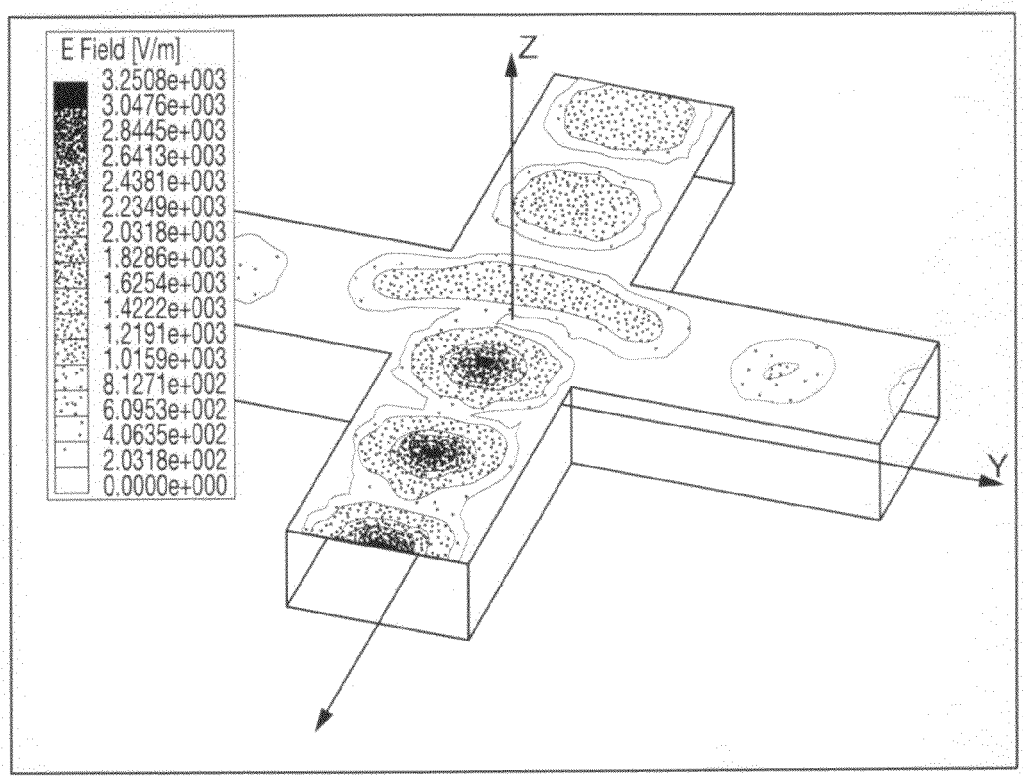

In addition, waveguides and/or coupling channels could be placed transversely through the disc structures of FIG. 12 to provide another means of independent control to the electron beam, examples of which are depicted in FIGS. 24(A) and 24(B). Extrapolation from coupling techniques used in telecommunications applications of PBG fibers generally provide poor guidance for coupling techniques appropriate for exciting the different modes of interest here. Metalized waveguide couplers can be replaced by dielectric equivalents (or variations) due to the shorter attenuation lengths for metals at these wavelengths. However, the scales are drastically reduced for the present cases so that, in some cases, using metals in disk couplers can still be considered since the length scales involved can be less than about 1 mm. Non-optimized examples of couplers exciting an array of defects are shown for a directional coupler (FIG. 24A) and pass-through coupler (FIG. 24B)

It is interesting to notice that conventional waveguides e.g. WR1 reach up to 1.1 THz and we have designed metallic disk couplers with length scales up to a mm that provide both directional and pass-through variants using HFSS for defect arrays such as shown below in FIG. 21.

Figure 1:
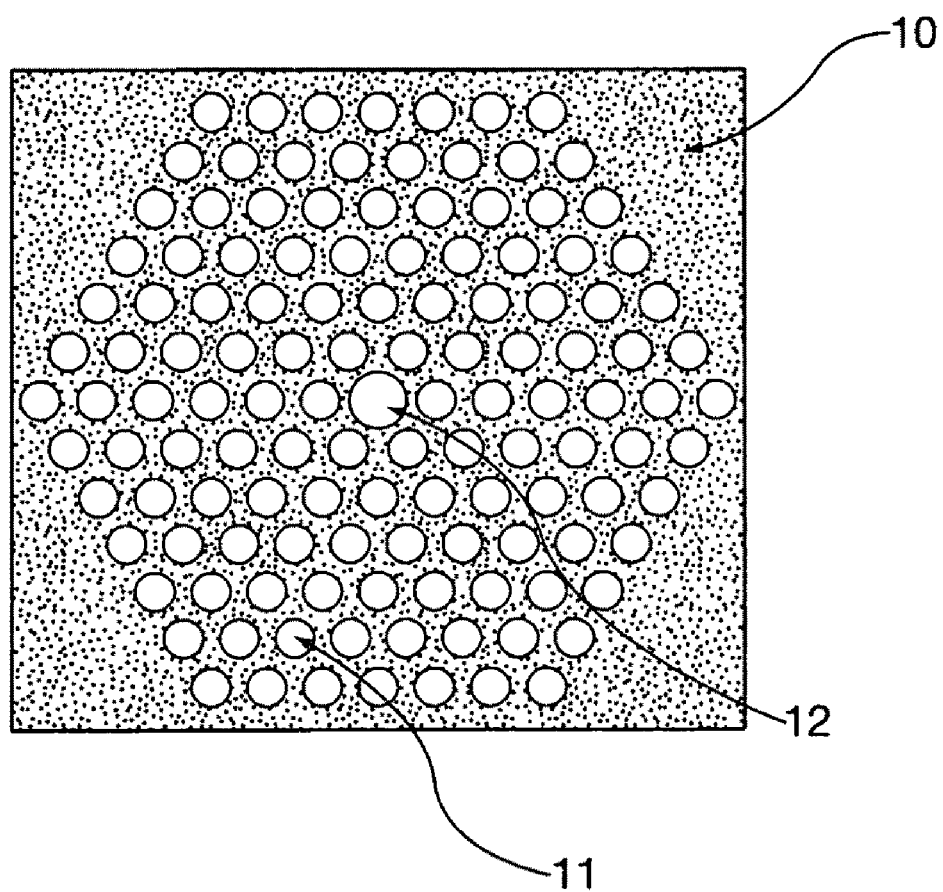
FIG. 1: A cross sectional schematic depiction viewed along the axial direction of a typical PBG fiber following Lin.
Figure 14:
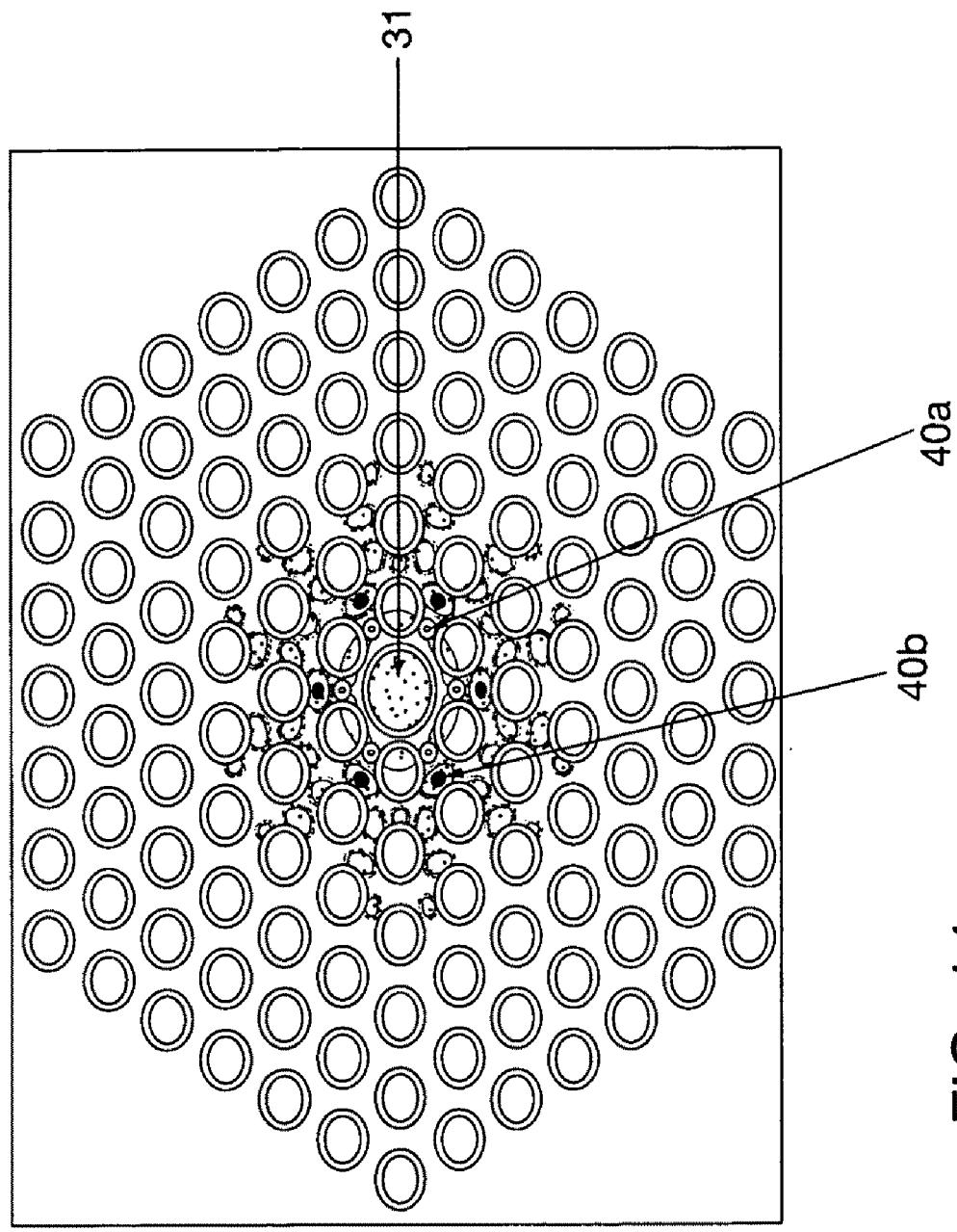
FIG. 14: A cross sectional depiction of computed $E_z$ values for the fiber of FIG. 13 with additional holes 40a introduced at the location of hot spots 30a (from FIG. 13). The color coding is the same as FIG. 3.
Figure 15:
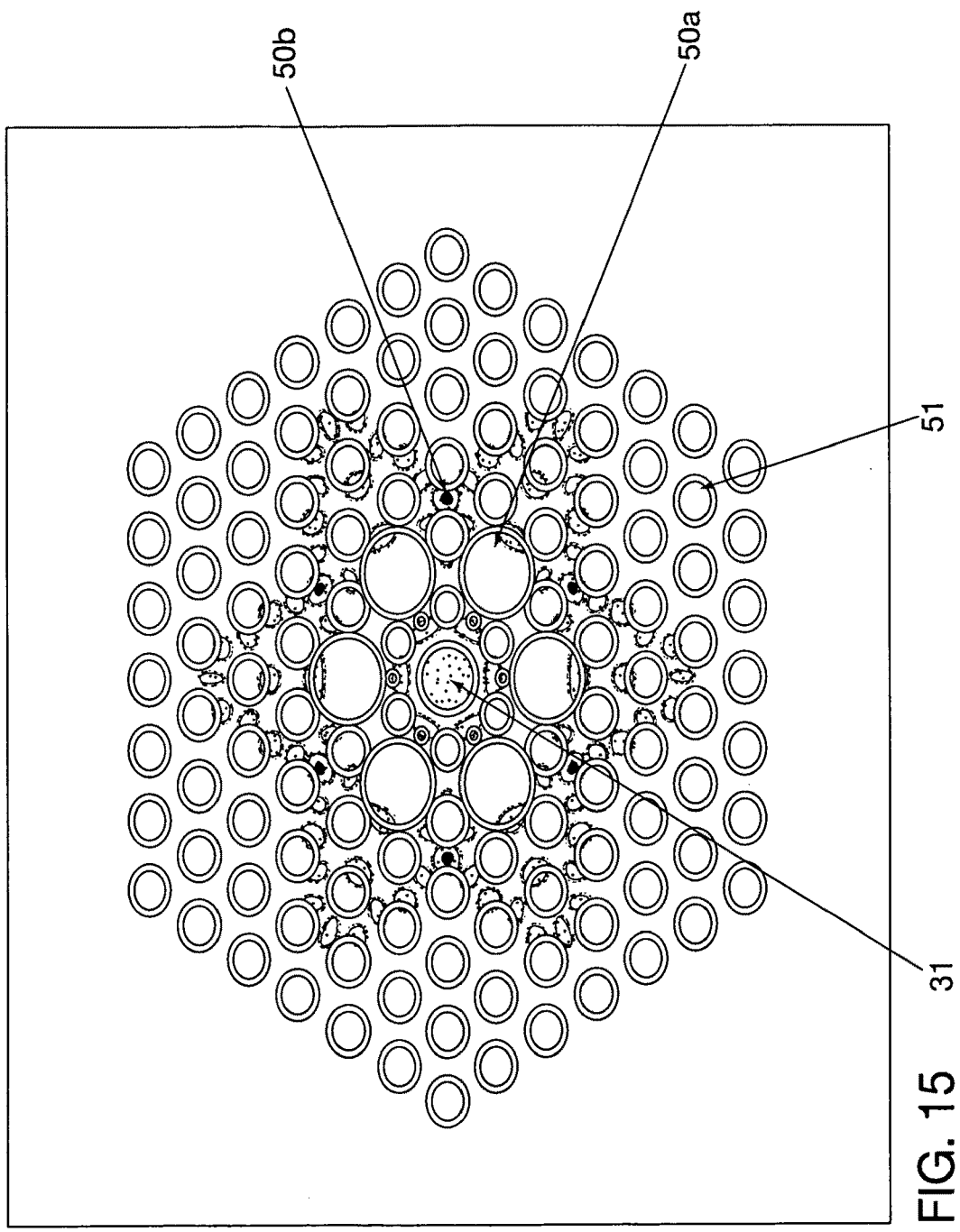
FIG. 15: A cross sectional depiction of computed $E_z$ values for the fiber of FIG. 14 with additional, large diameter capillaries 50a. The color coding is the same as FIG. 3.

FIGS. 14 and 15 show that significant alterations or perturbations can be made to the basic periodic lattice structure (as depicted in FIGS. 1, 3) leading to different modes but retaining the substantial uniformity of the field within the central core 31, suggesting the excitation of new special purpose modes by means of symmetric, aperodicities.

Figure 13:
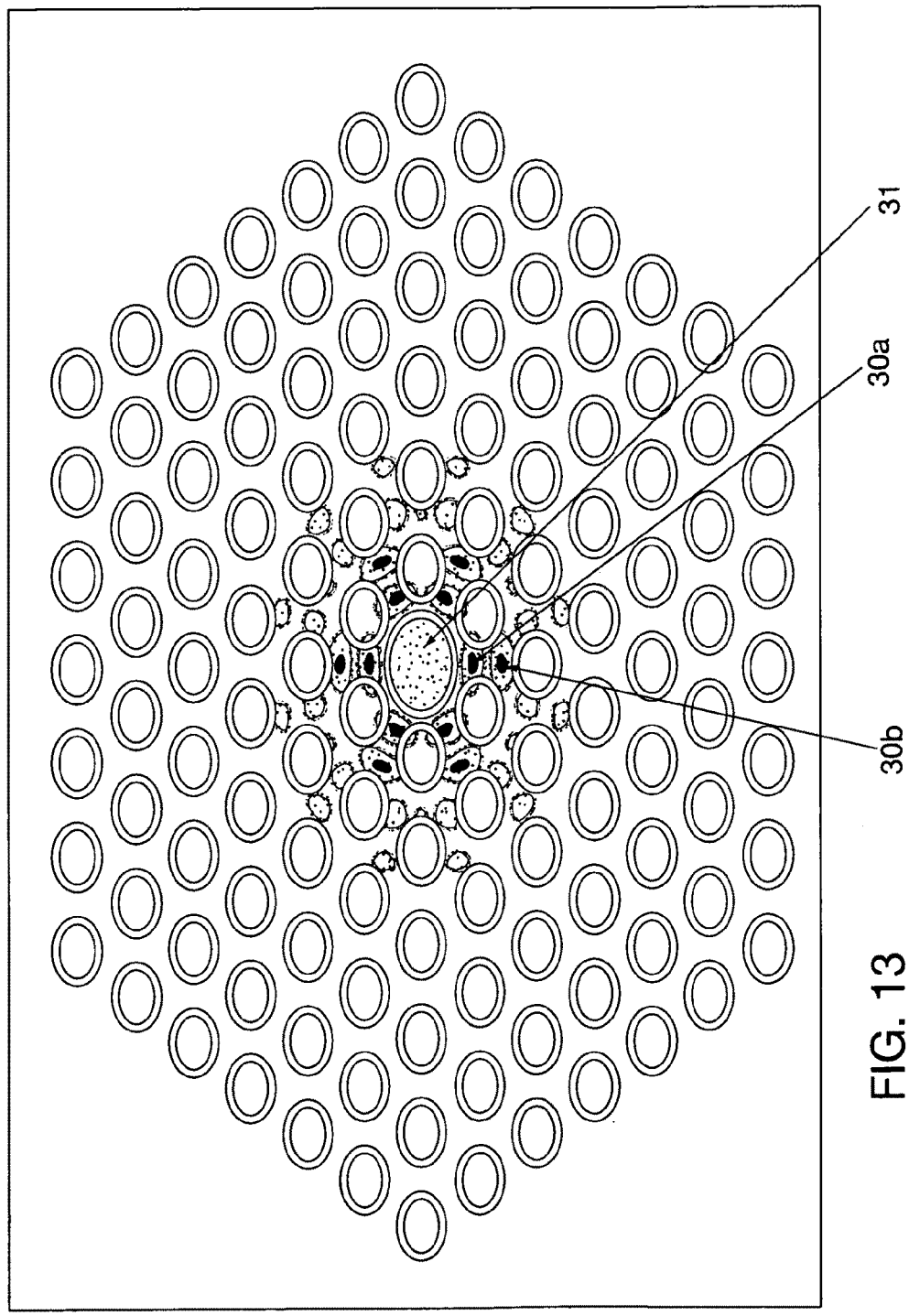
FIG. 13: A cross sectional depiction of computed $E_z$ values near the speed of light line for a PBG fiber F1 having the geometry depicted. The color coding is the same as FIG. 3.

FIG. 13 is a numerical simulation for a $TM_{01}$-like mode computed near the speed of light line at $\lambda_{sol}=1$ µm for a lattice vacancy pitch of p=1.3 µm, vacancy diameter 2 r=0.92 µm and a central core or defect diameter D=1.4 µm. The electric field intensity in the longitudinal direction (z-direction) is indicated by the colors, increasing from blue (smallest) to green through yellow, orange and red (largest). $\lambda_{sol}$ denotes the wavelength of the line ω=k in the band gap diagram. While not precisely the same as λ in Table 1, $\lambda_{sol}$ and λ are typically not too different.

We note in particular in FIG. 13 regions of high electric field intensity or "hot spots," 30a, 30b. The six-fold symmetry leads to two rings of 6 hot spots (in red), 6 closer to the central core (one of which is denoted by 30a in FIG. 13), and a second ring of 6 hot spots further removed from the central core, e.g. 30b. The maximum electric field accelerating gradient that is achievable in the device is limited by the breakdown field at the locations of maximum field intensity, that is at the hot spots. Thus, even though the maximum electric field does not occur at the location of the central core containing the electron beam, 31, that maximum field away from central core 31 in fact limits the delivery of energy into the beam. This is a general consideration for such PBG structures, especially accelerators, that the maximum field that can be tolerated before breakdown will likely not occur at the site of the beam to be accelerated but nevertheless determines the maximum accelerating gradients that can be achieved with that particular design.

Numerical simulations have been performed using HFSS electromagnetic simulation code in which a 6-fold pattern of slot couplers (waveguide-like structures) was introduced into the fiber of FIG. 13 such that each coupler extended from the outer circumference of the fiber in to either the outer hot spots (30b), or the inner hot spots (30a), at which points each coupler terminated. The laser energy delivered through such coupler(s) typically delivers energy to the $TM_{01}$-like mode efficiently but it is expected that improved efficiency can be obtained by testing the transverse field hot spots in this way and by the imposition of the additional capillaries (examples of which are depicted in FIGS. 14 and 15) for the longitudinal field.

Figure 18:
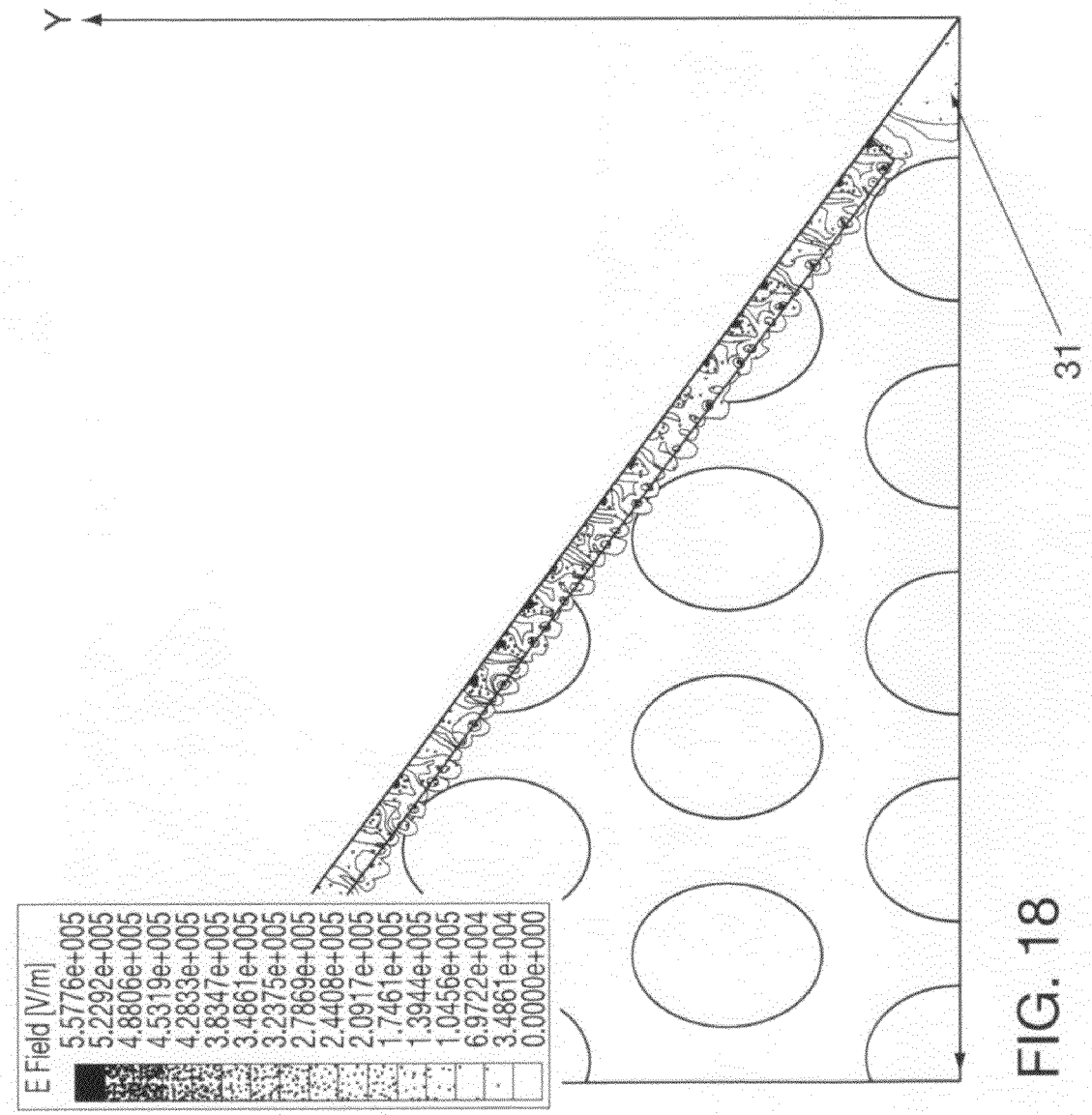
FIG. 18: $E_z$ values calculated for the case of a single waveguide extended from the outer surface of the PBG fiber to the inner hot spots are depicted for the case of a single waveguide (that is, a lengthened version of the waveguide depicted in FIG. 16).

For purposes of the simulations reported herein (some results of which are depicted in FIGS. 16-18), a high index material was used to model the couplers. However, we believe the use of such a material in the simulations does not alter our conclusions presented below in any substantial way.

Since the maximum electric field achievable in the PBG accelerator is limited by the first portion of the device to experience a breakdown, one approach to improving performance is to identify the locations of the hot spots and modify only those portions of the device. Perhaps such modifications will modify the overall performance of the device in unacceptable ways, but numerical simulations performed herein indicate that this is not the case, although other modifications of the lattice may be necessary in order to adjust other characteristics, such as modifications to the effective index arising from the presence of the added waveguide, among other changes.

We depict in FIG. 14 the calculated electric fields for the structure of FIG. 13, modified such that hot spots 30a no longer occur at the locations of matter (which is subject to breakdown), but in newly introduced holes, 40a. That is, the fiber of FIG. 13 is modified to introduce additional holes, 40a, into its structure at those locations at which hot spots occurred in the unmodified PBG fiber. The numerical simulations indicate that the introduction of these holes eliminates those hot spots while introducing no substantially detrimental modifications to the other electrical characteristics of the device. The persistence of the outer ring of hot spots having 6-fold symmetry when the fiber of FIG. 13 is modified to become the fiber of FIG. 14, 30b▶ 40b, even when capillaries 40a are introduced close to the central core or defect 31, is evidence of no substantial changes in the overall field of FIG. 14, especially in the defect.

We provide computational results elsewhere herein indicating that extending a coupler from the outer edge of the PBG fiber and terminating on a hot spot can be an effective way to suppress the hot spot at the coupler's inner terminus. Thus, one may consider combining these effects, for example, dealing with interior hot spots 30a by the use of additional capillaries, 40a, and dealing with the outer hot spots, 30b, 40b, by introducing couplers having one terminus at the locations of the outer hot spots. However, introducing a coupler to the depths of the hot spots is facilitated by having the hot spots of interest further away from the central core or defect and closer to the outer circumference of the fiber. In fact, this displacement of hot spots can be accomplished as demonstrated by the PBG fiber depicted in FIG. 15.

Additional capillaries or holes, 50a, can be introduced into the fiber having larger diameters than the general capillaries, 52, while retaining the overall symmetry of the structure (6-fold symmetry for the example considered here FIGS. 13-15). The numerical simulation, the results of which are depicted in FIG. 15, shows that hot spots 50b can be made to occur further from the central core 31, and thus more accessible to suppression by waveguide-like couplers or further addition of capillaries, presumably small as in FIG. 14. We especially point out that the same effects just discussed for the longitudinal hot spots apply to the transverse field hot spots and that these provide the preferred terminations for the waveguides for the most efficient excitation of the accelerating mode. Other modes may well differ in this characteristic, but it is expected that the basic techniques discussed here can be applied in those cases as well.

Figure 16B:
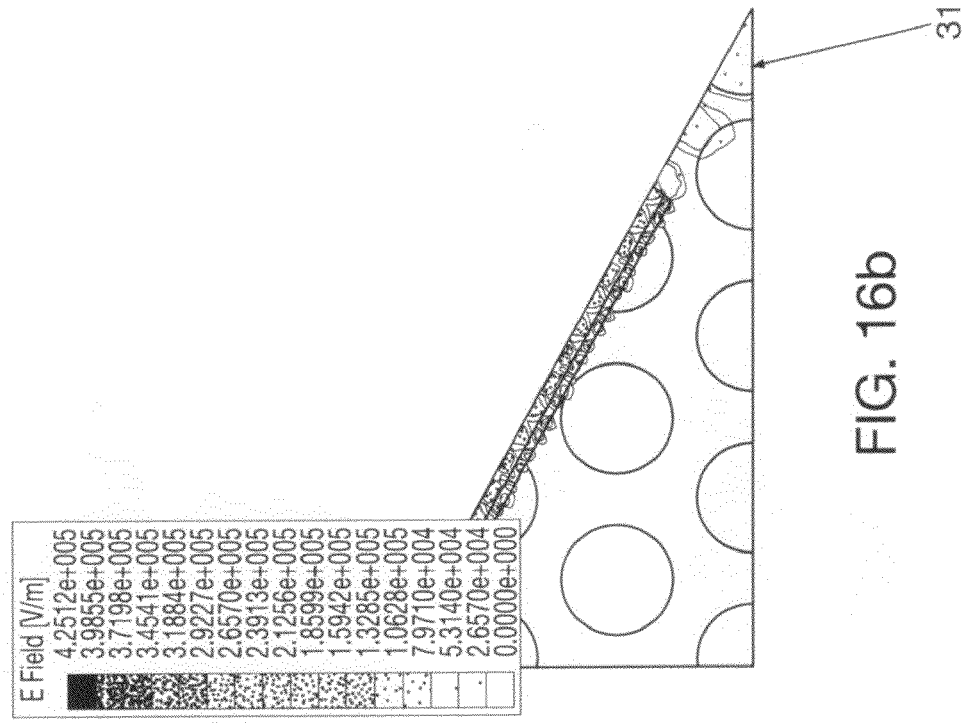
FIG. 16: 16a is a schematic cross sectional depiction of a dielectric waveguide from the exterior of the PBG fiber (upper left of FIG. 16a) to the central core 31. The computed electric fields $E_z$ for the fiber including this waveguide are depicted in 16b.
Figure 16A:
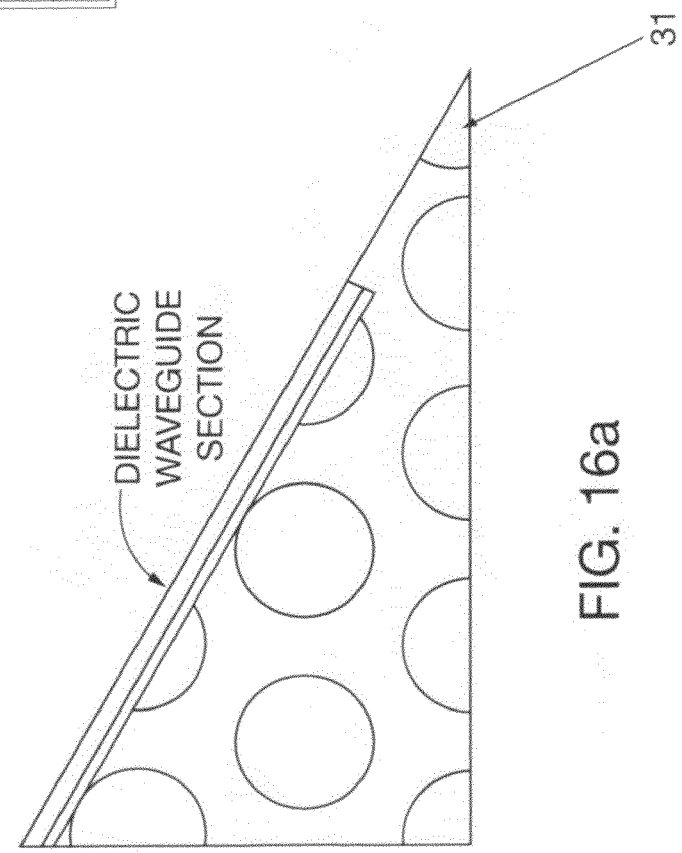

We show in FIGS. 16 and 17 electric field calculations for a side-coupled dielectric waveguide with 6-fold symmetry in which the waveguide ends at a hot spot further from the central defect, that is, 30b in FIG. 13. FIG. 16a is a schematic cross sectional depiction of the dielectric waveguide from the exterior of the PBG fiber (upper left of FIG. 16a) to the central core 31. The computed electric fields are depicted in FIG. 16b. The waveguide depicted in FIG. 16 would have reflections (that is, $S_{11}$) but the mismatch is not bad as evidenced by the uniform spreading toward the defect.

FIG. 17 depicts computed electric field strengths $E_z$ for an input coupler and output coupler separated by $\lambda/2$ and located in parallel as depicted in FIG. 17. These dual input-output couplers also have 6-fold symmetry. We observe in FIG. 17 the absence of hot spots.

The results depicted in FIGS. 16, 17 show that insertion of a dielectric waveguide, even as far as hot spot 30b, has no serious effect on the fundamental defect mode generated in the central defect 31. Evidence of this non-disruption can be found in the apparent absence of serious changes to the field pattern in the central defect from FIG. 13 (no waveguides) to FIGS. 16b, 17 having 6-fold symmetric input waveguides or 6-fold symmetric input and output waveguides respectively.

Dielectric waveguide structures can be extended into the PBG fiber beyond the location of outer hot spots 30b, and as far as inner hot spots 30a. $E_z$ values calculated for the case of a single waveguide (that is, an extended version of FIG. 16) are depicted in FIG. 18. It is observed that passing the waveguide through the outer hot spots to terminate at the inner hot spots automatically eliminates the outer hot spots as well. We also observe that even this intrusion much closer to the central core of the PBG fiber at location 31, appears to cause no serious disruption to the field pattern in the central core.

In addition, we note that if this set of waveguides were the only source of energy into the fiber, the coupling of energy into the central defect appears to be better when the waveguides terminate at the inner, rather than the outer, hot spots, although no attempt was made to optimize this coupling by considering the effects of other variations of waveguide length or cross section into the PBG fiber or especially of using the transverse hot spots expected to be a better match.

As noted elsewhere herein, it is expected that increased electron beam intensity can be achieved by constructing a PBG fiber having several defects running axially along the PBG fiber but may also include directions around or across the width of the PBG fiber (perhaps in spiral or more complex patterns) all within a single, common boundary allowing, in principle, parallel production of several electron beams. For economy of language we refer to a PBG fiber having more than one defect running axially along the fiber as a "PBG fiber matrix," "fiber matrix" or simply "matrix." Accelerating several beams of electrons through one or more of these defects (but not necessarily all defects present) constitutes a "matrix accelerator".

However, it is important to understand what effects, if any, might arise from a coupling of electromagnetic modes between defects and/or arise from the proximity of one or more defects to the edge of the PBG fiber in such a fiber matrix. Also, the electromagnetic modes in one defect may be affected by the presence of a nearby neighboring defect even though the neighboring defect contains no electromagnetic modes. Numerical calculations have been done to address these questions.

Calculations are reported for the mode appropriate for accelerating electrons through a defect, that is, a $TM_{01}$-like mode. This is by way of illustration, not limitation, since this mode is easily identifiable and has many and varied embodiments. A person having ordinary skills in the field can readily introduce modifications to these specific examples within the scope of the present invention.

Figure 19A:
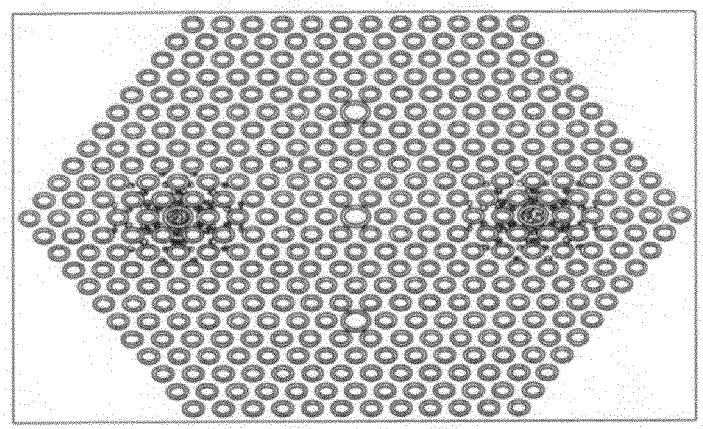
FIG. 19: A cross sectional depiction of the electric field in the z-direction for various modes in a multi-defect PBG fiber matrix as modeled with CUDOS.
Figure 19B:
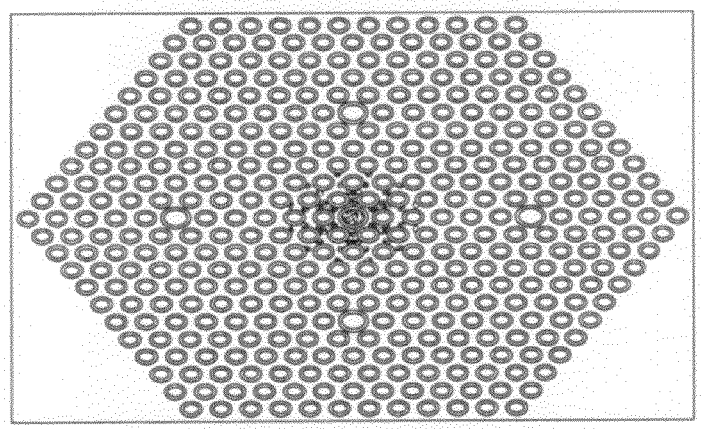

FIG. 19 depicts electric field intensities in the z-direction computed for a fiber matrix having five defects in which modes have been excited in one or two of the defects. FIG. 19B is comparable to FIG. 13. One can see in FIG. 19 a hexagonal pattern of "hot spots" of relatively high electric field intensity in the z-direction, E. The device is expected to fail at that value of electric field in which the strength of the field first exceeds the breakdown field at that field's location. Since different field values occur at different locations in the fiber matrix (as depicted in FIG. 19 and elsewhere), and different locations may have different breakdown fields, a fiber structure placing the largest fields at those locations having the largest breakdown fields results in increasing the fields the device can tolerate before breakdown. Thus, in the operation of a matrix accelerator similar to FIG. 19, it is expected that these hot spots will limit the accelerating gradients that are obtainable and can be placed in favorable locations with proper fiber design as discussed previously in reference to FIGS. 13-15 and 16-18.

Figure 19C:
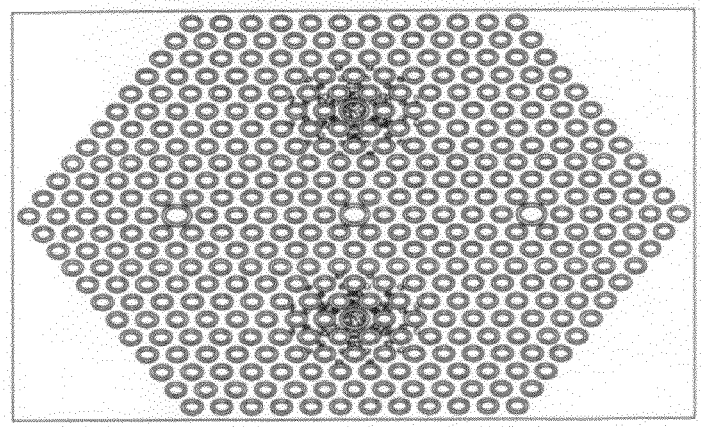

FIGS. 19A and 19C would be identical if the arrangement of capillaries extended to very large distances. However, a careful comparison of FIG. 19A with FIG. 19C indicates slight differences in electric field intensity. In particular, 19C has somewhat higher field intensities in the direction of the central defect while FIG. 19A shows higher field intensities in the direction perpendicular to the line directed towards the central defect. It is expected that these slight differences are due to the proximity of the edge of the fiber matrix. That is, the surface geometry of capillaries affecting the modes of FIG. 19A is different from the surface geometry of capillaries affecting the modes of FIG. 19C, resulting in slightly different mode structures. Since the differences in mode structure are not very great, it is expected that the addition of an additional ring of capillaries between the outer defects of FIG. 19 and the edge of the fiber matrix will reduce the electric field differences due to edge effects to insignificance.

Figure 20A:
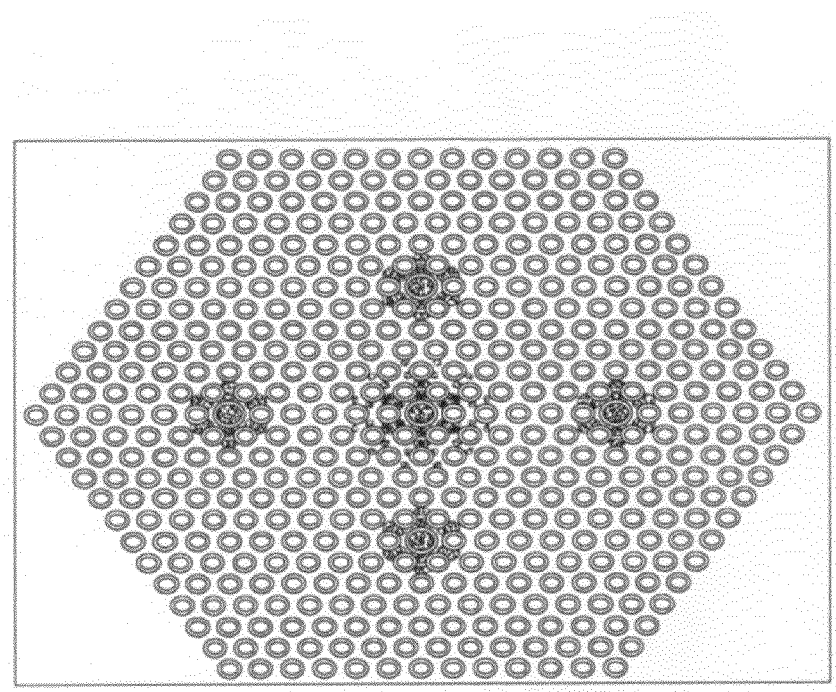
FIG. 20: A cross sectional depiction of electric field intensity for new modes, complimentary to those in FIG. 19, whose local distributions resemble those of FIG. 3 and FIG. 19, also showing the effects of radiative losses due to proximity of the fiber matrix borders in this example.
Figure 20B:
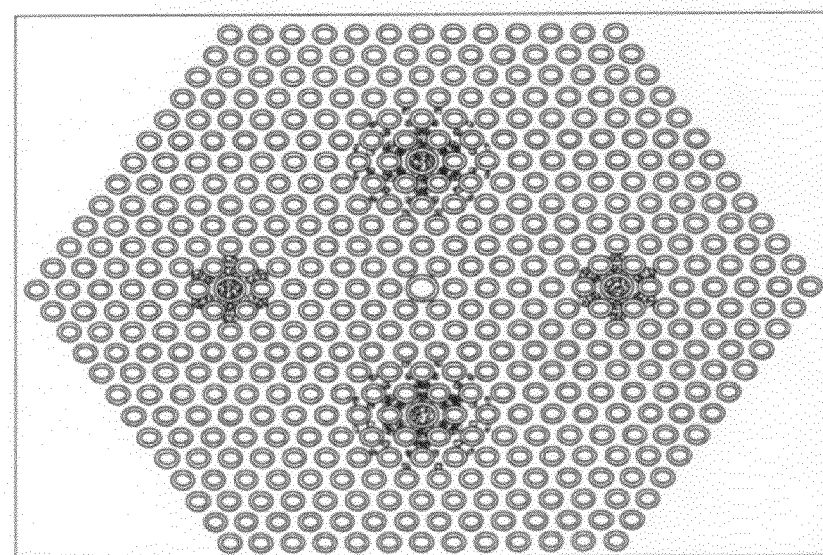
Figure 21:
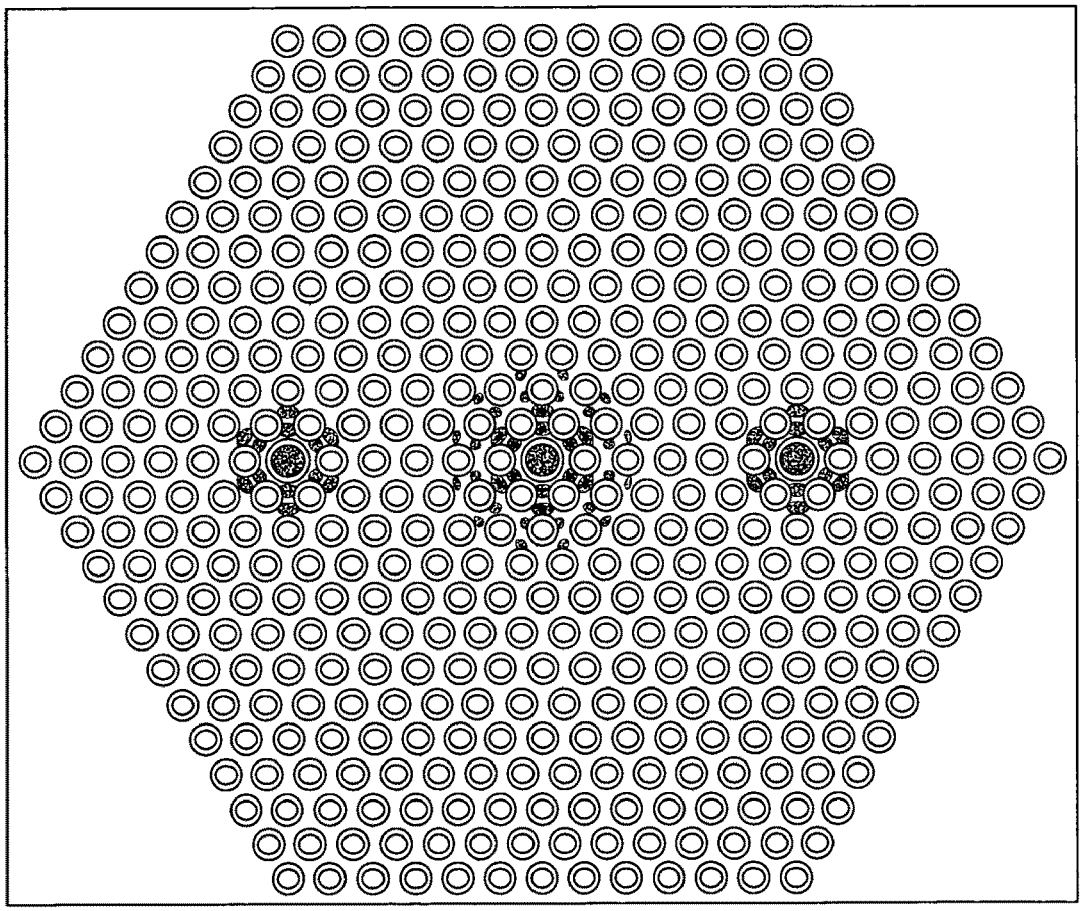
FIG. 21: A cross sectional depiction of electric field intensity for a linear three-defect array showing a mode in which all the defects are excited with the same accelerating mode shown in previous figures.

FIGS. 20 and 21 show additional examples of collective modes for differing defect arrays and provide information about the possible disruption of the basic accelerating mode in one defect due to similar modes propagating in one or more neighboring defects (not necessarily nearest neighbor defects). While many geometric arrangements of defects can be considered within a fiber matrix, it is expected that the major effect upon the basic mode structure will be due to the separation of the defects rather than on particular geometric effects (materials, capillaries, etc. being held constant). We see in FIGS. 20 and 21, similar to FIG. 19, that the proximity of the edge of the matrix tends to perturb the modes in the outer defects, perhaps by increasing losses and draining intensity. However, these disturbances are seen to be relatively small so we can expect no substantial deleterious effects if we maintain adequate separations between defects and from defects to the edge of the matrix. Based on these calculations, it is expected that an adequate approximation to unperturbed performance can be obtained with a defect period or pitch "P" about 6× the capillary pitch (or separation) or P about (7 to 8)$\lambda$ or about 15 $\mu$m for $\lambda$=2 $\mu$m. In other words, a fiber matrix of 1 sq. mm is expected to be able to support an array of defects about 130×130=16,900 defects without substantial coupling between modes in the defects.

Before passing on to a discussion of coupling schemes, it is important to point out that the additional defects or capillaries that we have discussed have many other uses such as modifying the coupling symmetries that would typically apply which is discussed in more detail below but before that we discuss another important use related to those of quenching hot spots as in FIGS. 14, 15 and those related to the disk phase shifters and the arrays of FIGS. 19-21. By using additional capillaries placed strategically and filled with different material types and densities that may also include optically active materials that lase and that can be coupled to the accelerating defects or others cavity types one has the potential to effectively solve several problems simultaneously. Materials such as YAG have the kinds of characteristics that appear ideally suited to such purposes.

Figure 22:
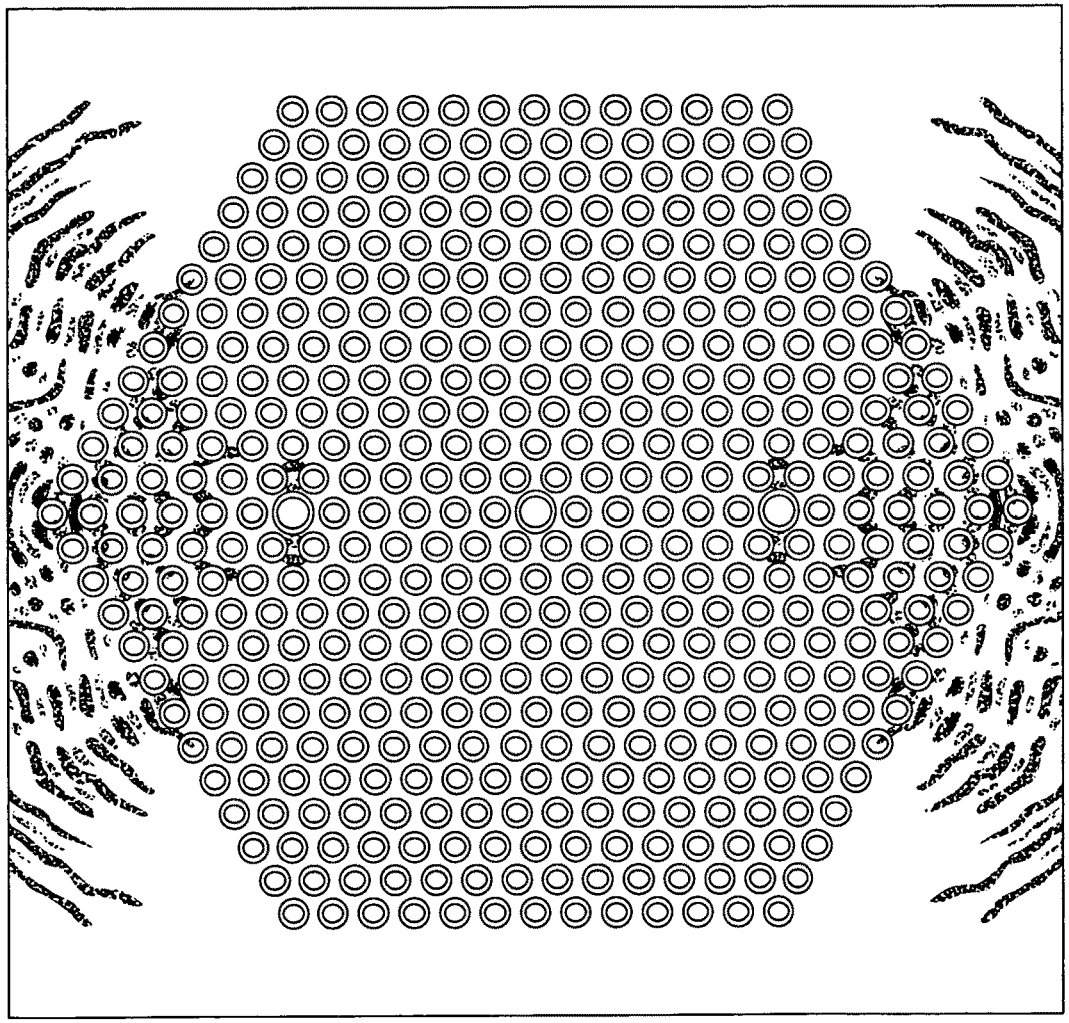
FIG. 22: Cross sectional depiction of Re[Ez] that is dominated, in this example, by constructive interference between the radiative losses from the three defects excited by the same longitudinal accelerating mode. Notice the reduction in symmetry from the single defect cases considered earlier.

FIG. 22 is a more detailed field pattern (Re[$E_z$]) for the defect configuration of FIG. 21 showing |$E_z$|. It is seen that the radiative field pattern is dominated by the constructive interference arising from the radiative losses from the defects when they are excited by the same longitudinal accelerating mode. FIG. 22 clearly shows the different radiation paths tracing back to the peripheries of the different defects. As opposed to the six fold symmetric pattern required to side-couple power into FIG. 3, this appears to show that only a twofold, opposing laser array is required to excite these three defects. Thus, it indicates that bombarding the fiber matrix with inbound laser pulses directed towards the central'axis of the fiber matrix, and having a far-field pattern deriving from the radiation pattern computed as in FIG. 22, is expected to produce in the fiber matrix those modes that would cause the complimentary pattern of radiation. This provides one prescription for exciting the desired modes in the desired defect(s) of a fiber matrix by means of a properly tailored collection of laser pulses side-coupled to the fiber matrix bundle. While end coupling of radiation may be sufficient for exciting many modes of interest in such PBG fibers and fiber bundles, side coupling schemes deriving from a time-reversed consideration of radiation patterns such as FIG. 22 provides an alternative coupling scheme that can be simpler through a reduced number of laser beams.

Figure 23A:
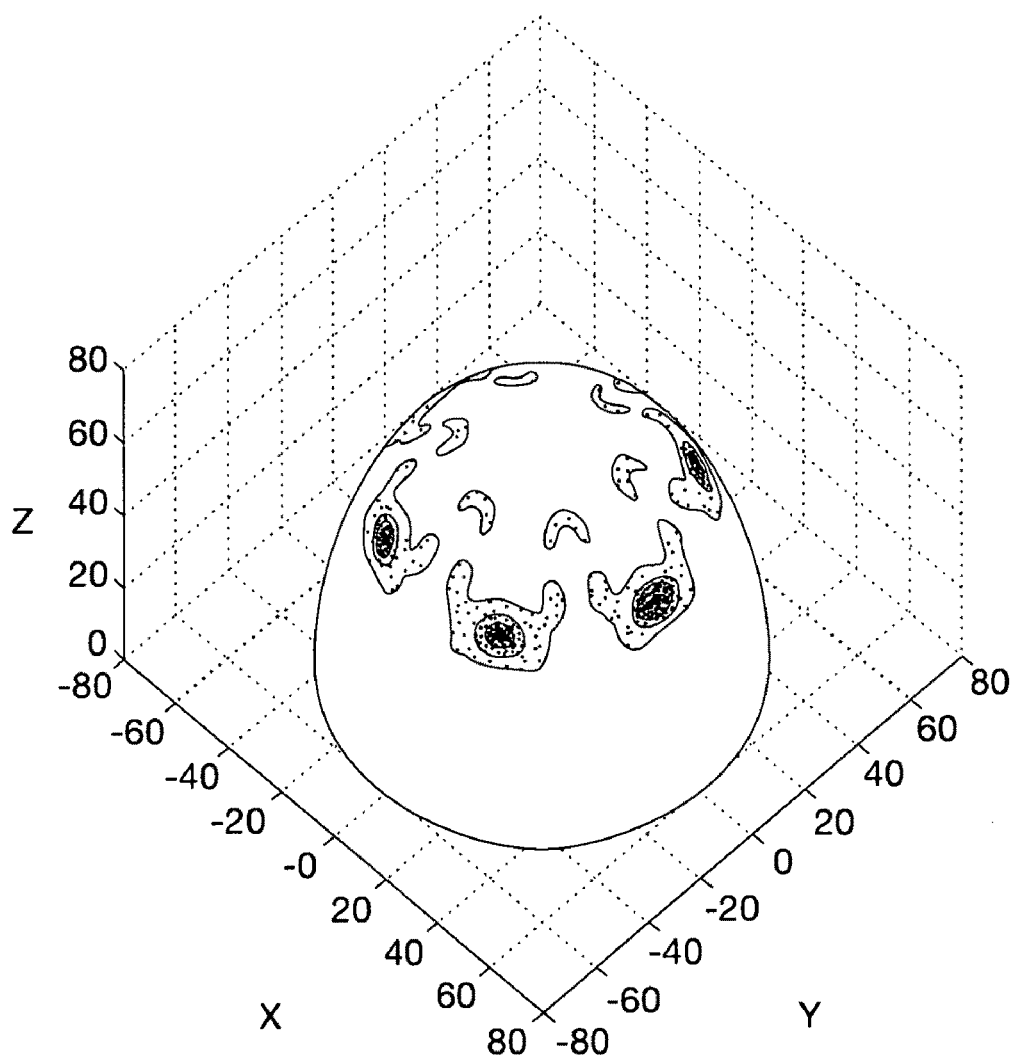
FIG. 23: (A) Poynting flux on the forward hemisphere at R=80λ from the fiber termination at z=0. The z-axis is normal to the source plane and coincident with the symmetry axis of the fiber. In the far field, beyond about R=60λ, this distribution closely approximates a Gaussian distribution as shown by the profiles in (B).
Figure 23B:
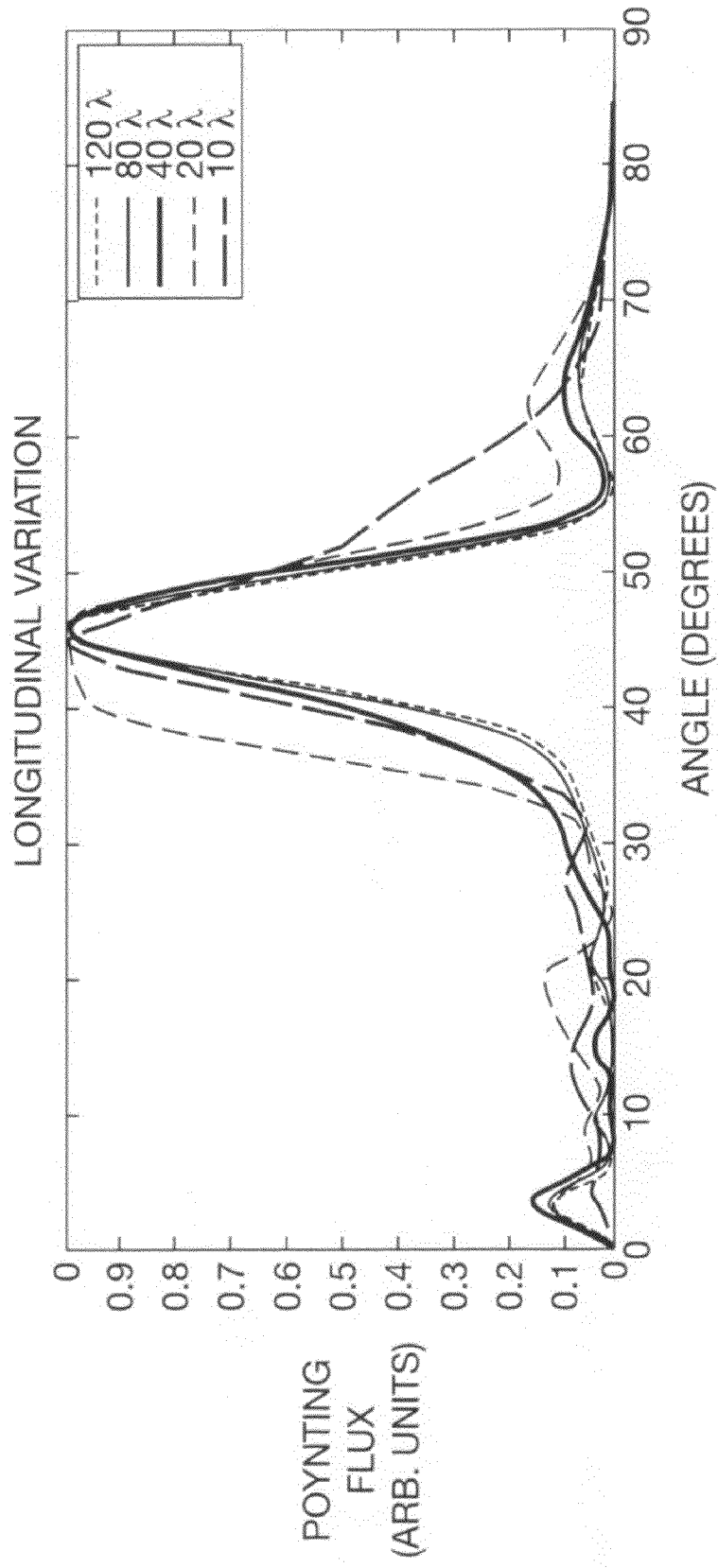

FIG. 23A depicts the far field radiation pattern computed by propagating the accelerating mode down the fiber to encounter a cleaved end for the single defect shown in FIG. 13. Thus, FIG. 23A provides the time reversed profile of laser intensity to be end-coupled back into the fiber in order to produce the accelerating mode. The intensity distributions from one of the hot spots (red) of FIG. 23A are depicted in FIG. 23B. The E and H fields are transversely polarized and orthogonal in this area with E polarization pointing towards the polar axis for all spots around the azimuth.

Further examples and computational details can be found in "Transmission and Radiation of an Accelerating Mode in a Photonic Bandgap Fiber," by C.-K. Ng et al Submitted for publication Jul. 7, 2010 to Phys. Rev. ST: Accel and Beams, the entire contents of which is incorporated herein by reference for all purposes. A copy of this document is submitted herewith as part of an Information Disclosure Statement and is made a part hereof.

FIG. 25 provides macro and SEM photomicrographs at different magnifications of a thin sliced wafer from a PBG accelerating mode manufactured for the SLAC National Accelerator Laboratory by Incom, Inc. of Charlton, Mass. The wafer has an outer diameter of 36 mm and a thickness of 1 mm. Examples run down to 2 $\mu$m wavelength. The example shown in FIG. 25 supports an accelerating mode at 8.4 $\mu$m. The darkening in the upper left portion of FIGS. 25(B) and 25(C) is believed to be due to charge buildup.

Although various embodiments which incorporate the teachings of the present invention have been shown and described in detail herein, those skilled in the art can readily devise many other varied embodiments that still incorporate these teachings.

TABLE 1

| Fiber | Material | n | $n_{eff}$ | $\lambda$($\mu$m) | r($\mu$m) | R($\mu$m) | p($\mu$m) | $N_{missing}$ |
|---|---|---|---|---|---|---|---|---|
| F1 | Silica | 1.46 | $1.001 + i*2.110*10^{-4}$ | 1.008 | 0.458 | 0.678 | 1.3098 | 1 |
| F2 | Silica | 1.46 | $1.002 + i*3.224*10^{-4}$ | 2.0 | 0.868 | 1.272 | 2.5445 | 1 |
| F3 | Silicon | 3.45 | $1.029 + i*3.338*10^{-3}$ | 2.0 | 0.603 | 0.844 | 1.507 | 2 |
| F4 | Silicon | 3.45 | $1.005 + i*1.086*10^{-5}$ | 1.5 | 0.377 | 1.207 | 0.942 | 2 |
| F5 | Silicon | 3.45 | $1.005 + i*1.086*10^{-5}$ | 2.0 | 0.503 | 1.609 | 1.257 | 2 |
| F6 | Silicon | 3.45 | $1.006 + i*2.900*10^{-5}$ | 1.5 | 0.359 | 1.077 | 0.897 | 2 |
| F7 | Silicon | 3.45 | $1.006 + i*2.900*10^{-5}$ | 2.0 | 0.478 | 1.435 | 1.196 | 2 |

What is claimed is:

1. A charged particle accelerator comprising: a photonic band gap fiber having one or more defects therein capable of transmitting charged particles axially therealong, a plurality of capillaries disposed around said one or more defects, one or wherein at least one of said one or more defects is capable of supporting an accelerating $TM_{01}$-like mode, and one or more couplers for depositing energy into said accelerating $TM_{01}$-like mode from lasers external to said photonic band gap fiber.

2. A charged particle accelerator as in claim 1 wherein said one or more couplers included at least one coupler chosen from the list consisting of:

dielectric waveguide coupler, rectangular waveguide coupler, directional coupler, or slot coupler.

3. A charged particle accelerator as in claim 1 further comprising at least one disk phase shifter, wherein said disk phase shifter has the photonic band gap structure supporting said $TM_{01}$-like mode and wherein said capillaries are modified so as to provide a changed index of refraction in at least one region surrounding said one or more defects.

4. A charged particle accelerator as in claim 1 further comprising one or more sextupole fields in said one or more defects wherein said one or more sextupole fields are capable of focusing and/or guiding the charged particles traversing axially said one or more defects.

5. A charged particle accelerator as in claim 1 wherein said one or more defects comprise at least two defects wherein the separation between each of said at least two defects is at least about 7 $\lambda$, thereby reducing coupling between modes in said defects.

6. A charged particle accelerator as in claim 1 wherein the distance from each of said one or more defects to the edge of said photonic band gap fiber is at least about 7 $\lambda$ thereby reducing effects of said edge of said photonic band gap fiber on modes in said one or more defects.

7. A photonic band gap fiber comprising one or more defects and a plurality of capillaries disposed around said one or more defects, wherein said photonic band gap fiber is capable of supporting one or more electromagnetic modes propagating along at least one of said one or more defects including a preferred mode, wherein said plurality of capillaries are disposed around said one or more defects in such manner so peak values for the transverse and longitudinal fields of said preferred mode occur at one or more locations resistant to breakdown, thereby increasing the power said photonic band gap fiber is capable of carrying.

* * * * *